(12) United States Patent
Park et al.

(10) Patent No.: US 10,354,798 B2
(45) Date of Patent: Jul. 16, 2019

(54) MULTILAYER CERAMIC CAPACITOR

(71) Applicant: SAMSUNG ELECTRO-MECHANICS CO., LTD., Suwon-Si, Gyeonggi-Do (KR)

(72) Inventors: Jae Sung Park, Suwon-si (KR); Jong Han Kim, Suwon-si (KR); Jin Seong Kim, Suwon-si (KR); Jeong Yun Park, Suwon-si (KR); Jae Yeol Choi, Suwon-si (KR); Sea Han Na Doo, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/949,623

(22) Filed: Apr. 10, 2018

(65) Prior Publication Data

US 2019/0115153 A1    Apr. 18, 2019

(30) Foreign Application Priority Data

Oct. 13, 2017    (KR) .................. 10-2017-0133580

(51) Int. Cl.
*H01G 4/30*    (2006.01)
*H01G 4/12*    (2006.01)
(Continued)

(52) U.S. Cl.
CPC ............. *H01G 4/1209* (2013.01); *H01G 4/30* (2013.01); *H01G 4/012* (2013.01); *H01G 4/248* (2013.01)

(58) Field of Classification Search
CPC ........ H01G 4/008; H01G 4/005; H01G 4/012; H01G 4/12; H01G 4/30; H01G 4/248; H01G 4/1227; H01G 2/06
See application file for complete search history.

(56) References Cited

U.S. PATENT DOCUMENTS 9,812,259 B2* 11/2017 Lee .................. H01G 4/30
9,812,261 B2* 11/2017 Fukunaga .......... H01G 4/012
(Continued)

FOREIGN PATENT DOCUMENTS

| JP | 2000-026161 A | 1/2000 |
| KR | 10-2010-0136917 A | 12/2010 |
| KR | 10-2013-0106569 A | 9/2013 |
| KR | 10-2015-0091758 A | 8/2015 |

*Primary Examiner* — Nguyen T Ha
(74) *Attorney, Agent, or Firm* — Morgan, Lewis & Bockius, LLP

(57) ABSTRACT

A multilayer ceramic capacitor includes: a ceramic body having first and second surfaces opposing each other and third and fourth surfaces connecting the first and second surfaces to each other; a plurality of internal electrodes disposed in the ceramic body, exposed to the first and second surfaces, and each having one end exposed to the third or fourth surface; and first and second side margin portions disposed on the first and second surfaces and covering exposed surfaces of the internal electrodes. A dielectric composition contained in the first and second side margin portions is different from a dielectric composition contained in the ceramic body, the first and second side margin portions contain a barium titanate-based base material powder and magnesium (Mg), manganese (Mn), and aluminum (Al) as accessory ingredients, and a content ratio of manganese (Mn) to magnesium (Mg), manganese (Mn), and aluminum (Al) satisfies $0.316 \leq Mn/(Mn+Mg+Al) \leq 0.500$, based on a molar content of Mn, Mg and Al in the first and second side margin portions.

24 Claims, 10 Drawing Sheets

(51) Int. Cl.
    *H01G 4/248* (2006.01)
    *H01G 4/012* (2006.01)

(56) References Cited

U.S. PATENT DOCUMENTS

| | | | |
|---|---|---|---|
| 2011/0309718 A1* | 12/2011 | Ogawa | H01C 1/14 |
| | | | 310/311 |
| 2012/0262840 A1* | 10/2012 | Koizumi | H01G 4/1209 |
| | | | 361/321.2 |
| 2013/0250478 A1 | 9/2013 | Kim et al. | |
| 2014/0301013 A1* | 10/2014 | Kim | H01G 4/012 |
| | | | 361/301.4 |
| 2015/0221438 A1 | 8/2015 | Lim et al. | |
| 2017/0243697 A1* | 8/2017 | Mizuno | H01G 4/308 |

* cited by examiner

I-I'

Q

II-II'

MULTILAYER CERAMIC CAPACITOR

CROSS-REFERENCE TO RELATED APPLICATION(S)

This application claims the benefit of priority to Korean Patent Application No. 10-2017-0133580, filed on Oct. 13, 2017 in the Korean Intellectual Property Office, the disclosure of which is incorporated herein by reference in its entirety.

BACKGROUND

1. Field

The present disclosure relates to a multilayer ceramic capacitor and a method of manufacturing the same, and more particularly, to a multilayer ceramic capacitor which may exhibit improved mechanical strength, high-temperature reliability, and moisture resistance reliability, and a method of manufacturing the same.

2. Description of Related Art

In general, electronic components using a ceramic material, such as capacitors, inductors, piezoelectric elements, varistors, thermistors, or the like, include a ceramic body formed of a ceramic material, internal electrodes formed in the ceramic body, and external electrodes installed on a surface of the ceramic body to be connected to the internal electrodes.

Recently, as electronic products have been reduced in size and have had multifunctionality implemented therein, electronic components have also become more compact and more highly functional, and thus, a multilayer ceramic capacitor having a small size but a high capacitance has been demanded.

In order to provide a multilayer ceramic capacitor having a small size and high capacitance, it is essential to secure a dielectric material having high dielectric characteristics and excellent withstand voltage characteristics.

In addition, thinness of a dielectric layer and a significant increase in an effective area of an electrode (an increase in effective volume fraction required to implement capacitance) are required.

However, a phenomenon in which a thickness of the dielectric layer is locally decreased may occur due to the thinness of the dielectric layer and a step of a margin portion. Hence, a structural design should be modified to avoid a withstand voltage decrease phenomenon accompanying this phenomenon.

In order to prevent the withstand voltage decrease phenomenon while implementing a multilayer ceramic capacitor having a small size and high capacitance as described above, an area of internal electrodes may be significantly increased in a width direction through a margin-free design by allowing the internal electrodes to be exposed to the surfaces of the ceramic body in the width direction at the time of manufacturing the multilayer ceramic capacitor, and then separately attaching a margin portion to the sides of the ceramic body to cover exposed surface of the internal electrodes before sintering the capacitor.

However, according to the related art, in a case of manufacturing the multilayer ceramic capacitor as described above, a dielectric composition for forming a side margin portion was not differentiated from a dielectric composition of a ceramic body, and the dielectric composition of the ceramic body was used as it was.

Therefore, since a physical packing density of a dielectric material in the side margin portion is lower than in the ceramic body, densification of the side margin portion may be deteriorated and an interfacial void may be formed between an exposed side surface of the electrode and an adhesive surface of the margin portion due to sintering behavior mismatching between the dielectric material of the side margin portion and the internal electrode during the sintering.

Further, according to the related art, since a sintered body having a solid body is formed through high-temperature heat treatment after attaching a ceramic dielectric sheet serving as the margin portion to a green chip cut without the margin portion using a physical compressing method, when adhesion between the sheet for forming a margin portion and the electrode exposed surface is insufficient before the sintering, an exterior defect due to detachment of the margin portion and serious defects leading to interfacial cracks may be caused.

In addition, when a change in volume is accompanied in the capacitor due to contraction of the internal electrode during the high-temperature heat treatment, as a void is formed in the interface between the exposed side surface of the electrode and the margin portion, the void may serve as a starting point of crack occurrence or become a moisture penetration pathway, thereby deteriorating moisture resistance reliability.

Therefore, the dielectric material in a region of the margin portion should have excellent sintering driving force so as to secure a density of a sintered body at a level equal to that of the ceramic body even though the dielectric material has a lower physical packing density, thereby significantly decreasing a decrease in strength of the multilayer ceramic capacitor.

Further, the dielectric material used in the region of the margin portion should fill the interfacial void through more active mass transport at a high temperature.

In addition, the dielectric material should improve interfacial adhesion by forming an oxide layer in a surface portion of the internal electrode by a reaction with the internal electrode.

SUMMARY

An aspect of the present disclosure may provide a multilayer ceramic capacitor which may exhibit improved mechanical strength, high-temperature reliability, and moisture resistance reliability, and a method of manufacturing the same.

According to an aspect of the present disclosure, a multilayer ceramic capacitor may include: a ceramic body having first and second surfaces opposing each other and third and fourth surfaces connecting the first and second surfaces to each other; a plurality of internal electrodes disposed in the ceramic body, exposed to the first and second surfaces, and each having one end exposed to the third or fourth surface; and first and second side margin portions disposed on the first and second surfaces and covering exposed surfaces of the internal electrodes. A dielectric composition contained in the first and second side margin portions is different from a dielectric composition contained in the ceramic body, the first and second side margin portions contain a barium titanate-based base material powder and magnesium (Mg), manganese (Mn), and aluminum (Al) as accessory ingredients, and a content ratio of manganese (Mn) to magnesium (Mg), manganese (Mn), and aluminum (Al) satisfying 0.316≤Mn/(Mn+Mg+Al)≤0.500, based on a molar content of Mn, Mg and Al in the first and second side margin portions.

According to another aspect of the present disclosure, a multilayer ceramic capacitor may include: a ceramic body having first and second surfaces opposing each other and third and fourth surfaces connecting the first and second surfaces to each other; a plurality of internal electrodes disposed in the ceramic body, exposed to the first and second surfaces, and each having one end exposed to the third or fourth surface; and first and second side margin portions disposed on the first and second surfaces and covering exposed surfaces of the internal electrodes. In a cross section of the ceramic body in a width-thickness direction, an oxide region containing magnesium (Mg) is disposed in portions of the internal electrodes adjacent to the exposed surfaces, the first and second side margin portions contain a barium titanate-based base material powder and magnesium (Mg), manganese (Mn), and aluminum (Al) as accessory ingredients, and a content ratio of manganese (Mn) to magnesium (Mg), manganese (Mn), and aluminum (Al) satisfying 0.316≤Mn/(Mn+Mg+Al)≤0.500.

According to another aspect of the present disclosure, a multilayer ceramic capacitor may include: a ceramic body having first and second surfaces opposing each other and third and fourth surfaces connecting the first and second surfaces to each other; a plurality of internal electrodes disposed in the ceramic body, exposed to the first and second surfaces, and each having one end exposed to the third or fourth surface; and first and second side margin portions disposed on the first and second surfaces and covering exposed surfaces of the internal electrodes. A dielectric composition contained in the first and second side margin portions is different from a dielectric composition contained in the ceramic body, the first and second side margin portions contain a barium titanate-based base material powder and magnesium (Mg), manganese (Mn), and aluminum (Al) as accessory ingredients, and contents of magnesium (Mg) and manganese (Mn) satisfy 0.75 mol≤Mg≤2.1 mol and 0.6 mol≤Mn≤2.0 mol, based on 100 mol of the base material powder, respectively.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
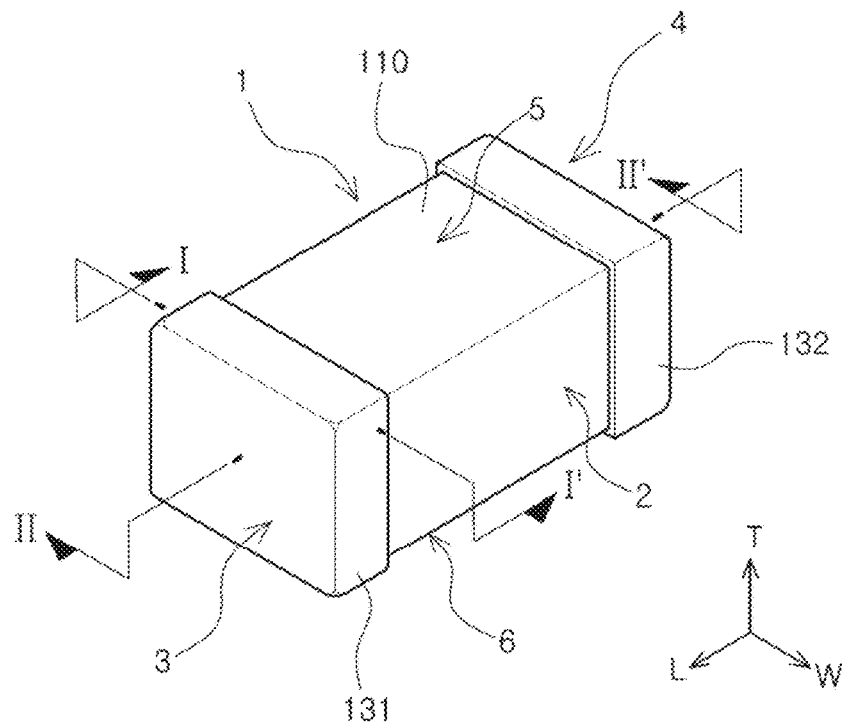
FIG. 1 is a schematic perspective view illustrating a multilayer ceramic capacitor according to an exemplary embodiment in the present disclosure.

FIG. 1 is a schematic perspective view illustrating a multilayer ceramic capacitor according to an exemplary embodiment in the present disclosure.

Figure 2:
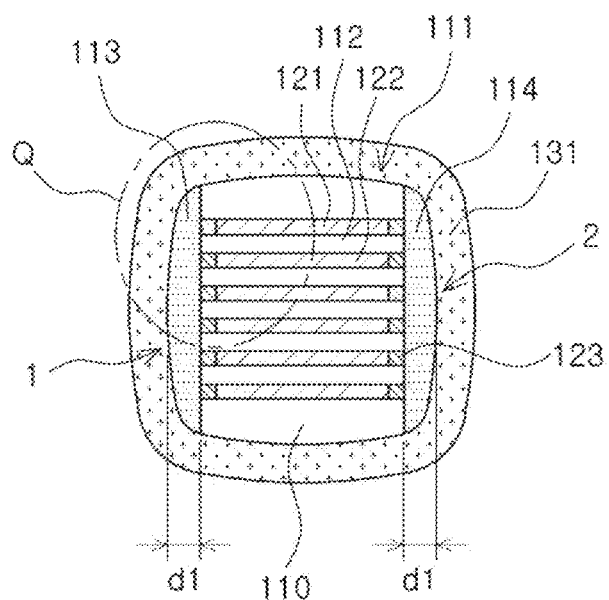
FIG. 2 is a cross-sectional view taken along line I-I' of FIG. 1.

FIG. 2 is a cross-sectional view taken along line I-I' of FIG. 1.

Figure 3:
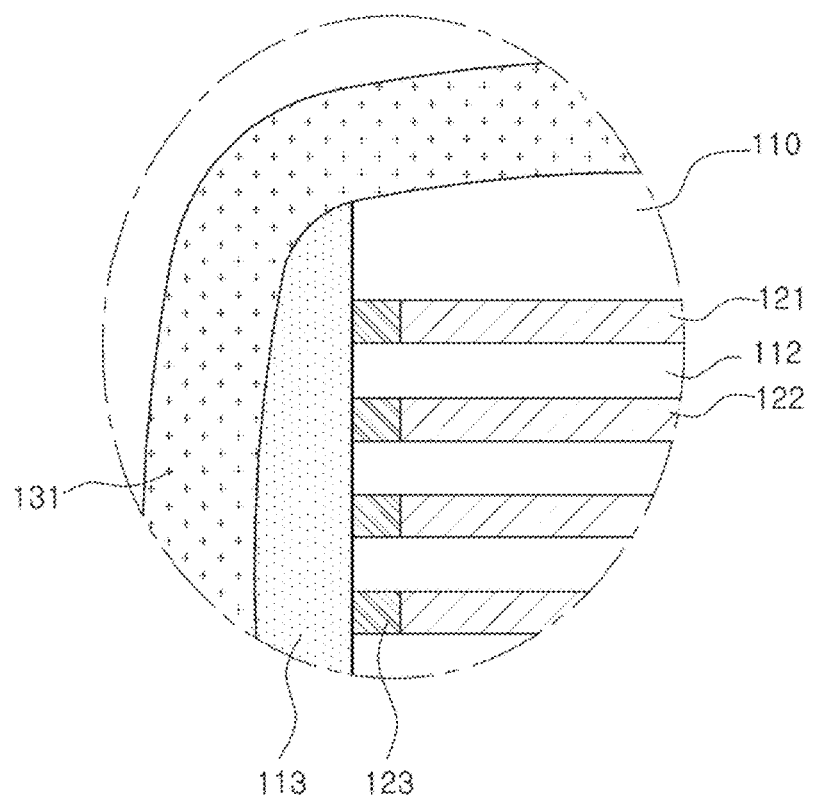
FIG. 3 is an enlarged view of part Q of FIG. 2.

FIG. 3 is an enlarged view of part Q of FIG. 2.

Figure 4:
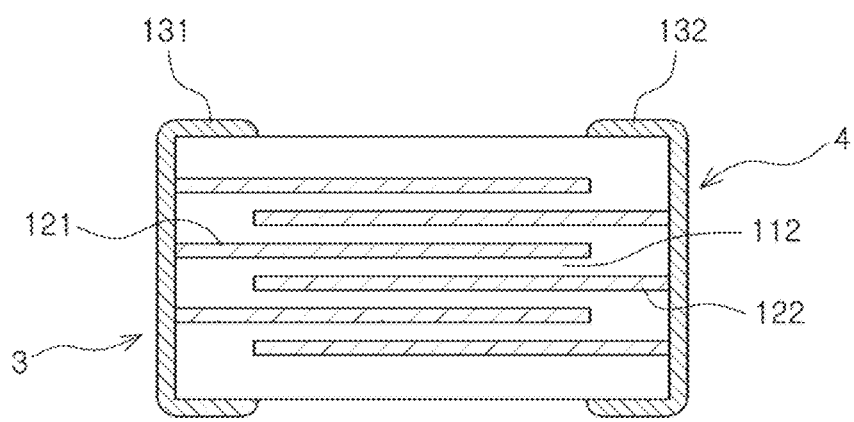
FIG. 4 is a cross-sectional view taken along line II-II' of FIG. 1.
Figure 5:
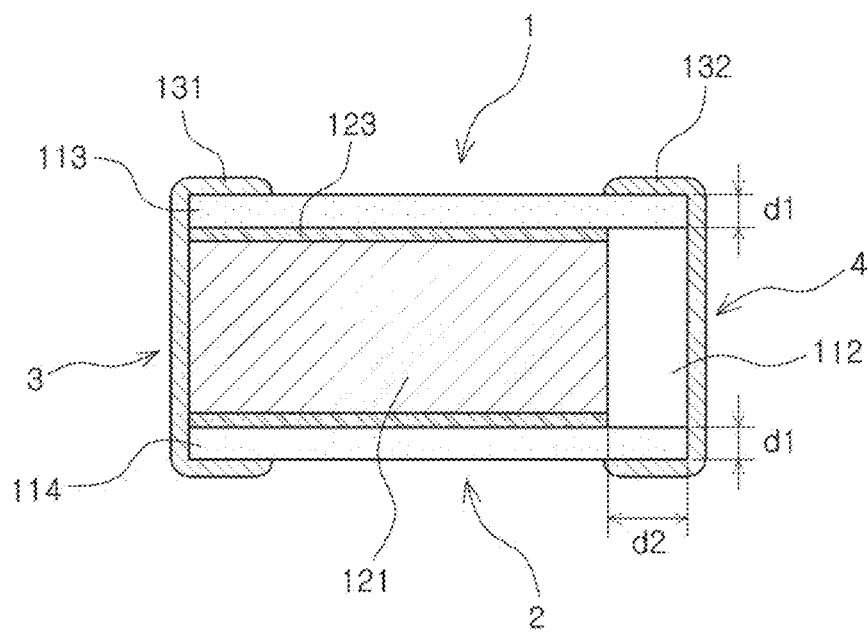
FIG. 5 is an upper plan view showing a dielectric layer configuring the multilayer ceramic capacitor illustrated in FIG. 1.

FIG. 4 is a cross-sectional view taken along line II-II' of FIG. 1, and FIG. 5 is an upper plan view showing a dielectric layer configuring the multilayer ceramic capacitor illustrated in FIG. 1.

Referring to FIGS. 1 through 5, the multilayer ceramic capacitor according to the exemplary embodiment in the present disclosure may include a ceramic body 110; a plurality of internal electrodes 121 and 122 formed in the ceramic body 110; and external electrodes 131 and 132 formed on an outer surface of the ceramic body 110.

The ceramic body 110 may have first and second surfaces 1 and 2 opposing each other, third and fourth surfaces 3 and 4 connecting the first and second surfaces to each other, and fifth and sixth surfaces 5 and 6 corresponding to upper and lower surfaces, respectively.

The first and second surfaces 1 and 2 may be defined as surfaces of the ceramic body 110 opposing each other in a width direction, the third and fourth surfaces 3 and 4 may be defined as surfaces of the ceramic body 110 opposing each other in a length direction, and the fifth and sixth surfaces 5 and 6 may be defined as surfaces of the ceramic body 110 opposing each other in a thickness direction.

A shape of the ceramic body 110 is not particularly limited, but may be a rectangular parallelepiped shape as illustrated.

Ends of the plurality of internal electrodes 121 and 122 formed in the ceramic body 110 may be exposed to the third or fourth surface 3 or 4 of the ceramic body.

The internal electrodes 121 and 122 may be formed as a pair of first and second internal electrodes 121 and 122 having different polarities from each other.

One end of the first internal electrode 121 may be exposed to the third surface 3 and one end of the second internal electrode 122 may be exposed to the fourth surface 4.

The other ends of the first and second internal electrodes 121 and 122 may be formed to be spaced apart from the third or fourth surface 3 or 4 by a predetermined interval. A more detailed description thereof will be provided below.

The first and second external electrodes 131 and 132 may be formed on the third and fourth surfaces 3 and 4 of the ceramic body to be electrically connected to the internal electrodes.

The multilayer ceramic capacitor according to the exemplary embodiment in the present disclosure may include the plurality of internal electrodes 121 and 122 disposed in the ceramic body 110, exposed to the first and second surfaces 1 and 2, and each having one end exposed to the third or fourth surface 3 or 4, and first and second side margin portions 113 and 114 disposed on the first and second surfaces 1 and 2, respectively, to cover exposed portions of the first and second internal electrodes 121 and 122.

The plurality of internal electrodes 121 and 122 may be formed in the ceramic body 110, side surfaces of each of the plurality of internal electrodes 121 and 122 may be exposed to the first and second surfaces 1 and 2, the surfaces of the ceramic body 110 in the width direction, and the first and second side margin portions 113 and 114 may be disposed on the first and second surfaces 1 and 2, respectively, to cover the exposed side surfaces of the first and second internal electrodes 121 and 122.

A thickness d1 of the first and second side margin portions 113 and 114 may be 18 μm or less.

According to the exemplary embodiment in the present disclosure, the ceramic body 110 may be configured of a laminate 111 in which a plurality of dielectric layers 112 are stacked and the first and second side margin portions 113 and 114 formed on both side surfaces of the laminate.

The plurality of dielectric layers 112 configuring the laminate 111 may be in a sintered state, and adjacent dielectric layers may be integrated with each other so that boundaries therebetween are not readily apparent.

A length of the laminate 111 may correspond to a length of the ceramic body 110, and the length of the ceramic body 110 may correspond to a distance between the third and fourth surfaces 3 and 4 of the ceramic body. That is, the third and fourth surfaces of the ceramic body 110 may be considered to be third and fourth surfaces of the laminate 111.

The laminate 111 may be formed by stacking the plurality of dielectric layers 112, and a length of the dielectric layer 112 may be the same as the distance between the third and fourth surfaces 3 and 4 of the ceramic body.

According to the exemplary embodiment in the present disclosure, the length of the ceramic body may be 400 to 1400 μm, but is not limited thereto. In more detail, the length of the ceramic body may be 400 to 800 μm or 600 to 1400 μm.

The internal electrodes 121 and 122 may be formed on the dielectric layers and be formed in the ceramic body with each of the dielectric layers interposed therebetween by sintering.

Referring to FIG. 5, the first internal electrode 121 may be formed on the dielectric layer 112. The first internal electrode 121 is not entirely formed in a length direction of the dielectric layer. That is, one end of the first internal electrode 121 may be formed to have a predetermined interval d2 from the fourth surface 4 of the ceramic body, and the other end of the first internal electrode 121 may be formed up to the third surface 3 of the ceramic body to be exposed to the third surface 3 of the ceramic body.

The other end of the first internal electrode exposed to the third surface 3 of the laminate may be connected to the first external electrode 131.

Differently from the first internal electrode, one end of the second internal electrode 122 may be formed to have a predetermined interval from the third surface 3, and the other end of the second internal electrode 122 may be exposed to the fourth surface 4 to thereby be connected to the second external electrode 132.

The dielectric layer 112 may have the same width as that of the first internal electrode 121. That is, the first internal electrode 121 may be entirely formed on the dielectric layer 112 in a width direction of the dielectric layer 112.

According to the exemplary embodiment in the present disclosure, the width of the dielectric layer and the width of the internal electrode may be 100 to 900 μm, but are not limited thereto. In more detail, the width of the dielectric layer and the width of the internal electrode may be 100 to 500 μm or 100 to 900 μm.

As the ceramic body is miniaturized, a thickness of the side margin portion may have an influence on electrical characteristics of the multilayer ceramic capacitor. According to the exemplary embodiment in the present disclosure, the side margin portion may be formed to have a thickness of 18 μm or less, thereby improving characteristics of the miniaturized multilayer ceramic capacitor.

In the exemplary embodiment in the present disclosure, the internal electrode and the dielectric layer may be formed by being simultaneously cut, such that the width of the internal electrode may be equal to that of the dielectric layer. A more detailed description thereof will be provided below.

In the present exemplary embodiment, the dielectric layer may be formed to have the same width as that of the internal electrode, such that the side surfaces of the internal electrodes 121 and 122 may be exposed to the first and second surfaces of the ceramic body 110 in the width direction.

The first and second side margin portions 113 and 114 may be formed on both side surfaces of the ceramic body 110 in the width direction, and may cover the exposed side surfaces of the internal electrodes 121 and 122.

The thickness of the first and second side margin portions 113 and 114 may be 18 μm or less. The thinner the thickness of the first and second side margin portions 113 and 114, the wider the area of an overlapping region between the internal electrodes formed in the ceramic body.

The thickness of the first and second side margin portions 113 and 114 is not limited as long as short-circuit of the internal electrodes exposed to the side surface of the laminate 111 may be prevented. For example, the thickness of the first and second side margin portions 113 and 114 may be 2 μm or more.

When the thickness of the first and second side margin portions is less than 2 μm, mechanical strength against external impact may be deteriorated, and when the thickness of the first and second side margin portions is more than 18 μm, the area of the overlapping region between the internal electrodes may be relatively decreased, such that it may be difficult to secure high capacitance of the multilayer ceramic capacitor.

In order to significantly increase capacitance of a multilayer ceramic capacitor, a method of thinning the dielectric layer, a method of highly stacking thinned dielectric layers, a method of increasing a coverage of the internal electrode, and the like, have been proposed.

Further, a method of increasing an area of an overlapping region between internal electrodes forming capacitance has been considered.

In order to increase the area of the overlapping region between the internal electrodes, a region of a margin portion on which the internal electrode is not formed needs to be significantly decreased.

In particular, as the multilayer ceramic capacitor is miniaturized, the region of the margin portion needs to be significantly decreased in order to increase the overlapping region between the internal electrodes.

According to the present exemplary embodiment, the internal electrode may be formed on the entire dielectric layer in the width direction and the thickness of the side margin portion may be set to be 18 μm or less, such that the area of the overlapping region between the internal electrodes may be increased.

Generally, as the dielectric layer is highly stacked, thicknesses of the dielectric layer and the internal electrode become thin. Therefore, the phenomenon in which the internal electrodes are short-circuited may frequently occur. In addition, when the internal electrode is formed only on a portion of the dielectric layer, an accelerated lifespan or reliability of insulating resistance may be deteriorated due to a step by the internal electrode.

However, according to the present exemplary embodiment, even though thin internal electrodes and thin dielectric layers are formed, since the internal electrode is entirely formed on the dielectric layer in the width direction, the area of the overlapping region between the internal electrodes may be increased, thereby increasing the capacitance of the multilayer ceramic capacitor.

In addition, an accelerated lifespan of insulating resistance may be improved by decreasing the step by the internal electrode, such that a multilayer ceramic capacitor having excellent capacitance characteristics and reliability may be provided.

According to the related art, in a case of manufacturing the multilayer ceramic capacitor as described above, a dielectric composition for forming a side margin portion was not differentiated from a dielectric composition of a ceramic body, but the dielectric composition of the ceramic body was used as it was.

Therefore, since a physical packing density of a dielectric material in the side margin portion is low, there are problems in that densification of the side margin portion is deteriorated and an interfacial void between an exposed side surface of the electrode and an adhesive surface of the margin portion due to sintering behavior mismatching between the dielectric material of the side margin portion and the internal electrode during the sintering may be formed.

The sintered body having a solid body may be formed through high-temperature heat treatment after attaching a ceramic dielectric sheet serving as the side margin portion to a green chip cut without the margin portion using a physical compressing method. Hence, when there is insufficient adhesion between the sheet for forming a margin portion and an exposed surface of the electrode before the sintering, an exterior defect due to detachment of the side margin portion and serious defects leading to interfacial cracks may be caused.

In addition, when a change in volume is accompanied in the capacitor due to contraction of the internal electrode during the high-temperature heat treatment, as a void is formed in the interface between the exposed side surface of the electrode and the margin portion, the void may serve as a starting point of crack occurrence or become a moisture penetration pathway, thereby deteriorating moisture resistance reliability.

Therefore, the dielectric material in the region of the margin portion should have excellent sintering driving force so as to secure a density of a sintered body at a level equal to that of the ceramic body even though the dielectric material has a lower physical packing density, thereby significantly preventing a decrease in strength of the multilayer ceramic capacitor.

Further, the dielectric material used in the region of the margin portion should fill the interfacial void through more active mass transport at a high temperature.

In addition, the dielectric material should improve interfacial adhesion by forming an oxide layer on an exposed side surface by a reaction with the internal electrode.

According to the exemplary embodiment in the present disclosure, a dielectric composition contained in the first and second side margin portions 113 and 114 may be different from a dielectric composition contained in the ceramic body 110.

Further, the first and second side margin portions 113 and 114 may contain a barium titanate-based base material powder and magnesium (Mg), manganese (Mn), and aluminum (Al) as accessory ingredients, wherein a content ratio of manganese (Mn) to magnesium (Mg), manganese (Mn), and aluminum (Al) satisfies $0.316 \leq Mn/(Mn+Mg+Al) \leq 0.500$, based on a molar content of Mn, Mg and Al in the first and second side margin portions.

The dielectric composition contained in the first and second side margin portions 113 and 114 may be different from the dielectric composition contained in the ceramic body 110, and the above-mentioned problems may be solved by allowing the first and second side margin portions 113 and 114 to contain the barium titanate-based base material powder and magnesium (Mg), manganese (Mn), and aluminum (Al) as the accessory ingredients and adjusting the content ratio of manganese (Mn) to magnesium (Mg), manganese (Mn), and aluminum (Al) to satisfy $0.316 \leq Mn/(Mn+Mg+Al) \leq 0.500$, based on a molar content of Mn, Mg and Al in the first and second side margin portions.

In detail, according to the exemplary embodiment in the present disclosure, a decrease in interfacial adhesion between the internal electrodes and the margin portion may be prevented, and formation of a void between the internal electrode and the margin portion may be prevented, such that reliability may be improved.

Further, a uniform oxide layer and a uniform insulating layer may be secured on the exposed side surfaces of the internal electrodes, such that a short-circuit defect may be decreased, and a density of the margin portion may be improved, such that mechanical strength and high-temperature/moisture resistance reliability of the multilayer ceramic capacitor may be improved.

When the content ratio [$Mn/(Mn+Mg+Al)$] of manganese (Mn) to magnesium (Mg), manganese (Mn), and aluminum (Al) is less than 0.316, based on a molar content of Mn, Mg and Al in the first and second side margin portions, a content of manganese (Mn) may be low, such that the void formed between the internal electrode and the margin portion may not be effectively filled, which may deteriorate reliability.

When the content ratio [$Mn/(Mn+Mg+Al)$] of manganese (Mn) to magnesium (Mg), manganese (Mn), and aluminum (Al) is more than 0.500, based on a molar content of Mn, Mg and Al in the first and second side margin portions, the content of manganese (Mn) may be excessively high, such that the internal electrode and ceramics may be excessively sintered, which may cause a problem such as an aggregation phenomenon of the internal electrode.

A content of magnesium (Mg) may satisfy $0.75 \text{ mol} \leq Mg \leq 2.10 \text{ mol}$, based on 100 mol of the base material powder.

The content of magnesium (Mg) maybe adjusted to satisfy $0.75 \text{ mol} \leq Mg \leq 2.10 \text{ mol}$, based on 100 mol of the base material powder, such that the uniform oxide layer and the uniform insulating layer may be secured on the distal end of the internal electrode and a decrease in interfacial adhesion between the internal electrode and the margin portion may be prevented.

When the content of magnesium (Mg) is less than 0.75 mol, based on 100 mol of the base material powder, the oxide layer and the insulating layer may not be effectively formed on the exposed side surface of the internal electrode, and the interfacial adhesion between the internal electrode and the margin portion may be decreased.

When the content of magnesium (Mg) is more than 2.10 mol, based on 100 mol of the base material powder, the density of the margin portion may be decreased, and a formation frequency of a secondary phase may be increased.

A content of manganese (Mn) may satisfy 0.6 mol≤Mn≤2.0 mol, based on 100 mol of the base material powder.

The content of manganese (Mn) may be adjusted to satisfy 0.6 mol≤Mn≤2.0 mol, based on 100 mol of the base material powder, such that the uniform oxide layer and the uniform insulating layer may be secured on the exposed side surface of the internal electrode, a decrease in interfacial adhesion between the internal electrode and the margin portion may be prevented, and reliability may be improved by preventing formation of voids between the internal electrode and the margin portion.

When the content of manganese (Mn) is less than 0.6 mol, based on 100 mol of the base material powder, the voids formed between the internal electrode and the margin portion may not be effectively filled, such that reliability may be deteriorated.

When the content of manganese (Mn) is more than 2.0 mol, based on 100 mol of the base material powder, the internal electrode and ceramics may be excessively sintered, such that a problem such as the aggregation phenomenon of the internal electrode may occur.

According to the exemplary embodiment in the present disclosure, the accessory ingredients may include sodium (Na) and lithium (Li), and contents of sodium (Na) and lithium (Li) may satisfy 0.5 mol≤Na≤1.5 mol and 0.5 mol≤Li≤1.5 mol, based on 100 mol of the base material powder, respectively.

The contents of sodium (Na) and lithium (Li) may be adjusted to satisfy 0.5 mol≤Na≤1.5 mol and 0.5 mol≤Li≤1.5 mol, based on 100 mol of the base material powder, respectively, such that a sintering density of the side margin portion may be improved.

When the contents of sodium (Na) and lithium (Li) are less than 0.5 mol, based on 100 mol of the base material powder, respectively, a liquid phase may be insufficiently formed due to an increase in melting temperature with Ba—Si, such that sintering driving force may be insufficient, which may cause a decrease in sintering density of the side margin portion.

Meanwhile, when the contents of sodium (Na) and lithium (Li) are more than 1.5 mol, based on 100 mol of the base material powder, respectively, oxygen vacancies may be formed due to deficient chemical reaction by substitution at Ba-site of $BaTiO_3$, which may cause a deterioration in dielectric characteristics.

Further, the accessory ingredient may include silicon (Si), and content ratios of silicon with respect to sodium (Na) and lithium (Li) may satisfy 0.68≤Si/(Na+Si)≤0.87, based on a molar content of Na and Si in the first and second side margin portions, and 0.68≤Si/(Li+Si)≤0.87, based on a molar content of Li and Si in the first and second side margin portions, respectively.

Since sodium (Na) and lithium (Li) mainly react together with silicon (Si) to form a liquid phase, ratios with an addition content of silicon (Si) are important, and according to the exemplary embodiment in the present disclosure, the content ratios of silicon (Si) may be adjusted to satisfy 0.68≤Si/(Na+Si)≤0.87, based on a molar content of Na and Si in the first and second side margin portions, and 0.68≤Si/(Li+Si)≤0.87, based on a molar content of Li and Si in the first and second side margin portions, such that the sintering density of the side margin portion may be improved.

When the contents of the accessory ingredients are out of the above-mentioned numerical ranges, a content of some of the accessory ingredients may be excessive or insufficient, such that the density of the side margin portion may be decreased or the dielectric characteristics may be deteriorated.

According to the exemplary embodiment in the present disclosure, the dielectric composition contained in the first and second side margin portions 113 and 114 may be different from the dielectric composition contained in the ceramic body 110. Hereinafter, the dielectric composition contained in the first and second side margin portions 113 and 114 will be described.

The first and second side margin portions may contain the barium titanate-based base material power and magnesium (Mg), manganese (Mn), sodium (Na), and lithium (Li) as the accessory ingredients and further contain the following accessory ingredients.

a) Base Material Main Ingredient

According to the exemplary embodiment in the present disclosure, a dielectric ceramic composition contained in the first and second side margin portions 113 and 114 may contain a base material main ingredient including Ba and Ti.

According to the exemplary embodiment in the present disclosure, the base material main ingredient may include $BaTiO_3$ or a main ingredient represented by $(Ba,Ca)(Ti,Ca)O_3$, $(Ba,Ca)(Ti,Zr)O_3$, $Ba(Ti,Zr)O_3$, or $(Ba,Ca)(Ti,Sn)O_3$ in which Ca, Zr, Sn, or the like, is partially solid-dissolved. The base material main ingredient may be contained in a powder form.

b) First Accessory Ingredient

According to the exemplary embodiment in the present disclosure, the dielectric ceramic composition may contain a first accessory ingredient containing one or more selected from the group consisting of oxides and carbonates of one or more elements among Y, Dy, Ho, Sm, Gd, Er, La, Ce, and Nd.

The first accessory ingredient may be contained in the dielectric ceramic composition in a content of 0.0 to 4.0 mol, based on 100 mol of the base material main ingredient.

The content of the first accessory ingredient may be based on a content of one or more elements among Y, Dy, Ho, Sm, Gd, Er, La, Ce, and Nd contained in the first accessory ingredient, regardless of the form of addition such as that of oxide or carbonate.

For example, a total content of at least one element of Y, Dy, Ho, Er, Gd, Ce, Nd, and Sm contained in the first accessory ingredient may be 4.0 mol or less based on 100 mol of the base material main ingredient.

According to the exemplary embodiment in the present disclosure, the first accessory ingredient may serve to prevent reliability of the multilayer ceramic capacitor using the dielectric ceramic composition from being deteriorated.

When the content of the first accessory ingredient is more than 4.0 mol, based on 100 mol of the base material main ingredient, high-temperature withstand voltage characteristics may be deteriorated due to formation of a pyrochlore ($RE_2Ti_2O_7$) (Here, RE is at least one element among Y, Dy, Ho, Sm, Gd, Er, La, Ce, and Nd) secondary phase.

c) Second Accessory Ingredient

According to the exemplary embodiment in the present disclosure, the dielectric ceramic composition may contain the second accessory ingredient containing one or more selected from the group consisting of oxides and carbonates of a Ba element.

The second accessory ingredient may be contained in the dielectric ceramic composition in a content of 0.0 to 5.0 mol, based on 100 mol of the base material main ingredient.

The content of the second accessory ingredient may be based on a content of the Ba element contained in the second accessory ingredient regardless of the form of addition such as that of oxide or carbonate.

When the content of the second accessory ingredient is 0.0 to 5.0 mol, based on 100 mol of the base material main ingredient, the high-temperature withstand voltage characteristics may be improved.

d) Third Accessory Ingredient

According to the exemplary embodiment in the present disclosure, the dielectric ceramic composition may contain a third accessory ingredient containing at least one of an oxide or carbonate containing at least one of Si and Al or a glass compound containing Si.

The third accessory ingredient may be contained in the dielectric ceramic composition in a content of 0.0 to 5.0 mol, based on 100 mol of the base material powder.

The content of the third accessory ingredient may be based on a content of Si or Al contained in the third accessory ingredient, regardless of the form of addition such as that of glass, oxide, or carbonate.

When the content of the third accessory ingredient is more than 5.0 mol, based on 100 mol of the base material powder, problems such as deterioration of a sintering property and density, formation of a secondary phase, and the like, may occur.

A multilayer ceramic capacitor according to another exemplary embodiment in the present disclosure may include a ceramic body 110 having first and second surfaces 1 and 2 opposing each other and third and fourth surfaces 3 and 4 connecting the first and second surfaces 1 and 2 to each other, a plurality of internal electrodes 121 and 122 disposed in the ceramic body 110, exposed to the first and second surfaces 1 and 2, and each having one end exposed to the third or fourth surface 3 or 4, and first and second side margin portions 113 and 114 disposed in portions of the internal electrodes 121 and 122 exposed to the first and second surfaces 1 and 2, wherein in a cross section of the ceramic body 110 in a width-thickness direction, an oxidation region 123 containing magnesium (Mg) is disposed on both side surfaces of the internal electrodes 121 and 122, and the first and second side margin portions 113 and 114 contain a barium titanate-based base material powder and magnesium (Mg), manganese (Mn), and aluminum (Al) as accessory ingredients, a content ratio of manganese (Mn) to magnesium (Mg), manganese (Mn), and aluminum (Al) satisfying 0.316≤Mn/(Mn+Mg+Al)≤0.500, based on a molar content of Mn, Mg and Al in the first and second side margin portions.

According to another exemplary embodiment in the present disclosure, in the cross section of the ceramic body 110 in a width-thickness direction, the oxidation region 123 containing magnesium (Mg) may be disposed in portions of the internal electrodes 121 and 122 adjacent to the exposed surfaces of internal electrodes 121 and 122.

The oxidation region 123 maybe be formed by a reaction between a metal oxide contained in the first and second side margin portions 113 and 114 and a metal configuring the internal electrodes 121 and 122 at the time of attaching the first and second side margin portions 113 and 114 to the side surfaces of the ceramic body 110.

The oxidation region 123 may contain the metal oxide, wherein the metal oxide is not particularly limited, but may be, for example, an oxide of at least one selected from the group consisting of magnesium (Mg), manganese (Mn), nickel (Ni), lithium (Li), silicon (Si), titanium (Ti), and barium (Ba).

Particularly, the oxidation region 123 may contain magnesium (Mg).

The oxidation region 123 may be observed by an electron microscope and have a color different from that of the internal electrode to thereby be distinguished from the internal electrode.

In FIGS. 2, 3, and 5, the oxidation region 123 is represented by a different line in order to distinguish the oxidation region 123 from the internal electrodes 121 and 122.

As described above, in a case of manufacturing a multilayer ceramic capacitor using a method of significantly increasing an area of internal electrodes in a width direction through a margin-free design by allowing the internal electrodes to be exposed to the body in the width direction, and then separately attaching a margin portion to an electrode exposed surface of a capacitor in the width direction before sintering the capacitor after manufacturing this capacitor, at the time of cutting the internal electrode exposed surface, electrodes on upper and lower layers may be connected to each other due to a slipping phenomenon of the internal electrode exposed surface, such that a short-circuit defect may occur and a withstand voltage may be decreased.

Further, a physical/chemical phenomenon in which an interface is split may occur due to a spontaneous reaction to decrease surface energy due to a decrease in specific surface area during the sintering in the interface at the time of metal-ceramic heterojunction.

Therefore, in order to solve these two problems, there is a need to select an element capable of forming a uniform oxide layer without a secondary phase while being easily solid-dissolved due to high affinity to nickel (Ni) used as the internal electrodes.

According to the exemplary embodiment in the present disclosure, binding force with ceramics of the side margin portion may be increased by formation of the oxide layer in addition to formation of a uniform insulating layer on distal ends of a nickel (Ni) electrode by adjusting an absolute content ratio of a Mg oxide having high oxygen affinity while having the same structure as that of NiO having a NaCl structure in which a ratio of cations and anions is 1:1.

Here, when the content ratio of Mg exceeds an optimal composition ratio, the sintering property may be deteriorated due to addition of an excessive amount of Mg or the withstand voltage may be decreased due to formation of a secondary phase. Therefore, it is very important to determine the content ratio.

Further, in order to improve withstand voltage characteristics of the multilayer ceramic capacitor and suppress occurrence of cracks in addition to moisture resistance reliability as additionally required characteristics, there is a need to secure the density of the side margin portion and effectively prevent voids adjacent to the exposed side surfaces of the electrode. To this end, first of all, there is a need to improve sintering driving force of the ceramics and induce active mass transport at a high temperature.

Active transport of atoms from the side margin portion may increase a drag-in effect of peripheral atoms including to voids adjacent to the exposed side surfaces of the electrode, thereby causing effective elimination of any voids.

As a technical method for the active mass transport, it is very important to add Mn and determine a suitable content ratio of Mn. Referring to a ternary phase diagram in a Mn—Mg—Al system, addition of Mn may promote formation of a liquid phase uniformly in all addition content ranges to increase mass transport by the sintering.

However, when the content ratio of Mn is high and thus, the content ratio of Mg is rather decreased, the above-mentioned effect of forming the insulating layer on the exposed side surfaces of the electrode and improving interfacial adhesion may be decreased. On the contrary, when the content of Mn is low, the content ratio of Mg is increased, such that the sintering density may be decreased, and a formation frequency of a secondary phase may be increased. Therefore, the optimal composition ratio [Mn/(Mn+Mg+Al)] was determined through actual experiment as described above.

Hereinafter, a method of manufacturing a multilayer ceramic capacitor according to another exemplary embodiment in the present disclosure will be described.

FIGS. 6A through 6F are cross-sectional views and perspective views schematically illustrating a method of manufacturing a multilayer ceramic capacitor according to another exemplary embodiment in the present disclosure.

Figure 6A:
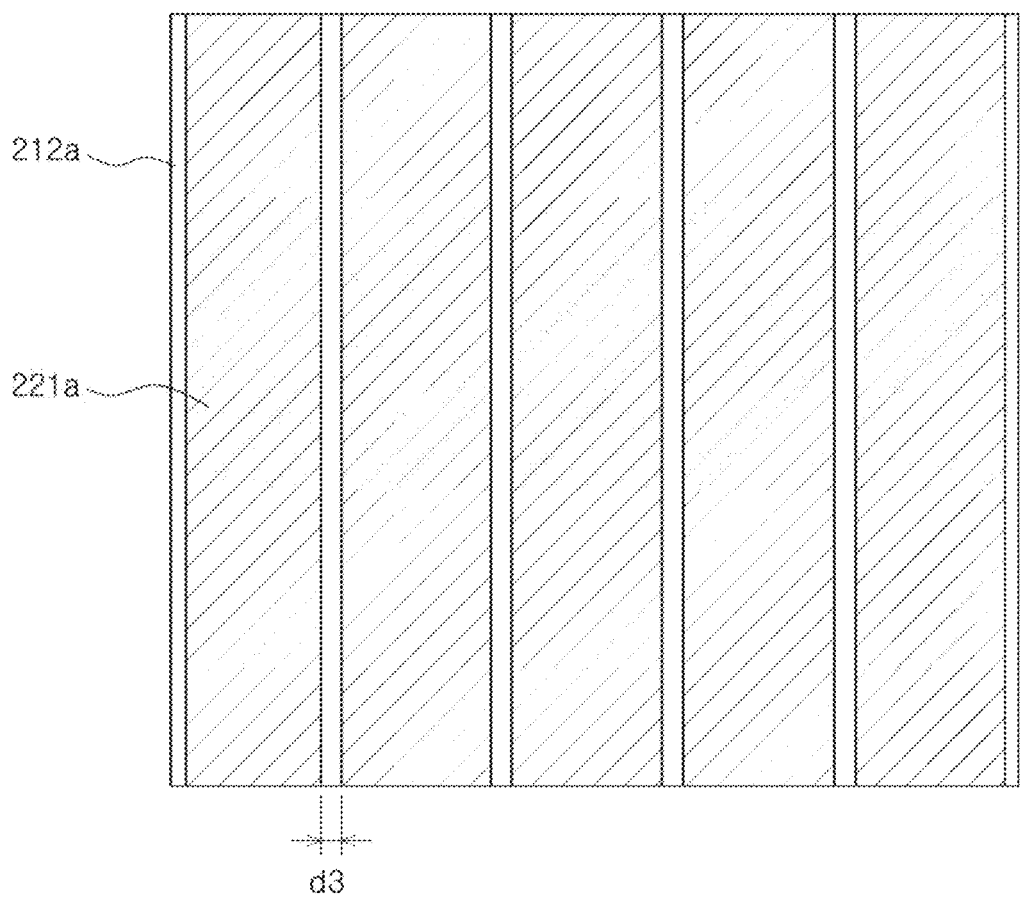
FIGS. 6A through 6F are cross-sectional views and perspective views schematically illustrating a method of manufacturing a multilayer ceramic capacitor according to another exemplary embodiment in the present disclosure.

As shown in FIG. 6A, a plurality of stripe-type first internal electrode patterns 221a may be formed on a ceramic green sheet 212a, having a predetermined interval d3. The plurality of stripe-type first internal electrode patterns 221a may be formed in parallel with each other.

The predetermined interval d3, which is a distance required to insulate the internal electrode from an external electrode having a different polarity, may be considered to be a distance of d2×2 shown in FIG. 5.

The ceramic green sheet 212a may be formed of a ceramic paste containing a ceramic powder, an organic solvent, and an organic binder.

The ceramic powder may be a material having high permittivity, and a barium titanate ($BaTiO_3$)-based material, a lead complex perovskite-based material, strontium titanate ($SrTiO_3$)-based material, or the like, may be used, but the ceramic powder is not limited thereto. Among them, barium titanate ($BaTiO_3$) powder may be preferable. When the ceramic green sheet 212a is sintered, the sintered ceramic green sheet may become a dielectric layer 112 configuring a ceramic body.

The stripe-type first internal electrode pattern 221a may be formed of an internal electrode paste containing a conductive metal. The conductive metal may be nickel (Ni), copper (Cu), palladium (Pd), or an alloy thereof, but is not limited thereto.

A method of forming the stripe-type first internal electrode pattern 221a on the ceramic green sheet 221a is not particularly limited. For example, a printing method such as a screen printing method or a gravure printing method may be used.

Further, although not illustrated, a plurality of stripe-type second internal electrode patterns 222a may be formed on another ceramic green sheet 212a, having a predetermined interval therebetween.

Hereinafter, the ceramic green sheet on which the first internal electrode pattern 221a is formed may be referred to as a first ceramic green sheet, and the ceramic green sheet on which the second internal electrode pattern 222a is formed may be referred to as a second ceramic green sheet.

Figure 6B:
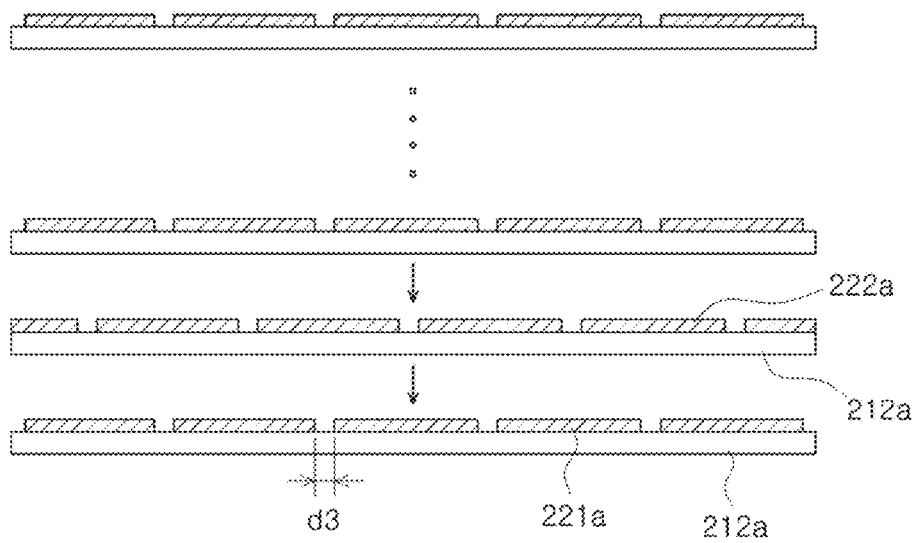

Next, as illustrated in FIG. 6B, the first and second ceramic green sheets may be alternately stacked so that the stripe-type first and second internal electrode patterns 221a and 222a are alternately stacked.

Thereafter, the stripe-type first internal electrode pattern 221a may form a first internal electrode 121 and the stripe-type second internal electrode pattern 222a may form a second internal electrode 122.

Figure 6C:
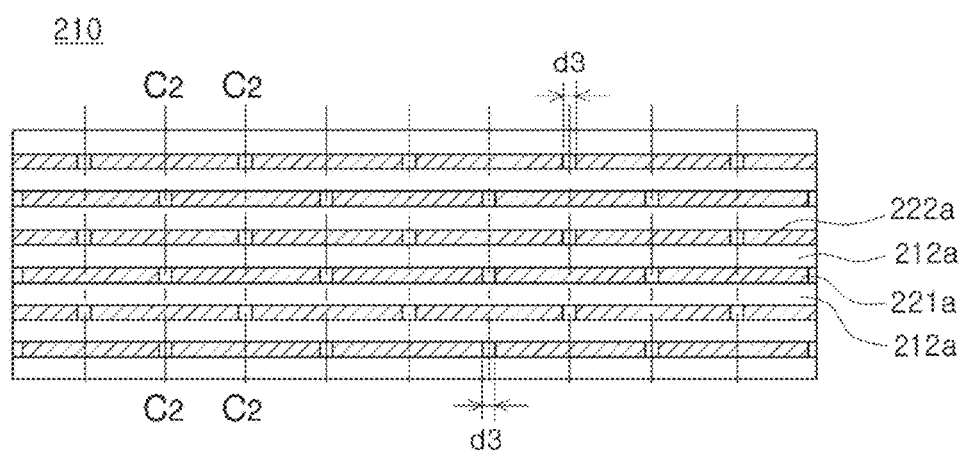
Figure 6D:
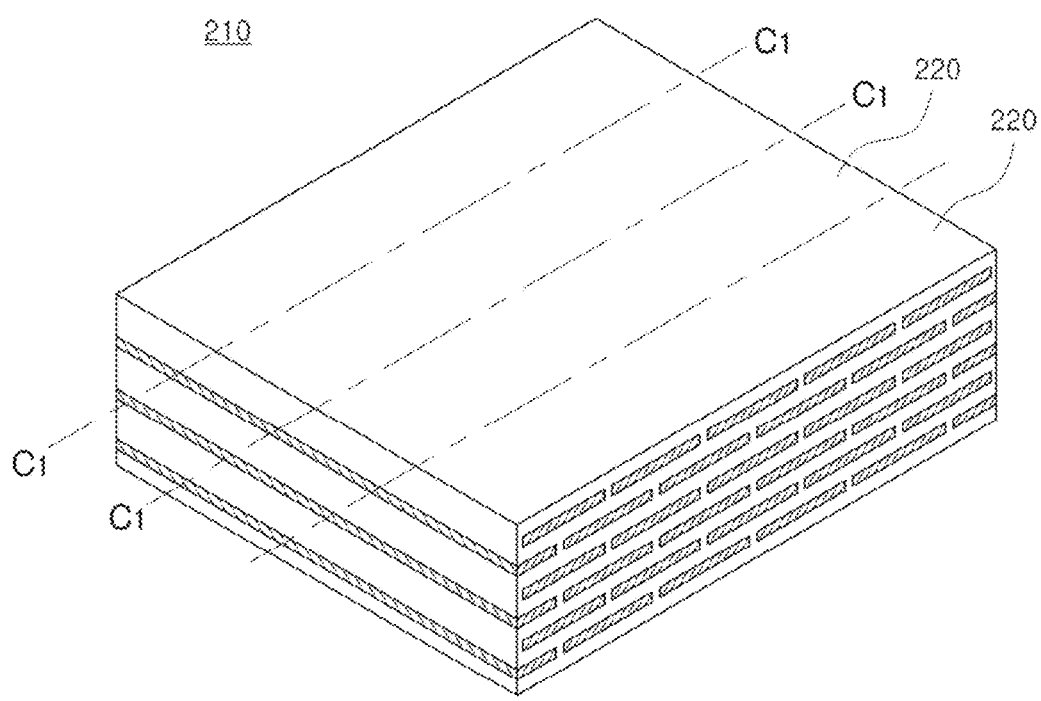

FIG. 6C is a cross-sectional view illustrating a ceramic green sheet laminate 210 in which the first and second ceramic green sheets are stacked according to the exemplary embodiment in the present disclosure, and FIG. 6D is a perspective view illustrating the ceramic green sheet laminate 210 in which the first and second ceramic green sheets are stacked.

Referring to FIGS. 6C and 6D, the first ceramic green sheet on which the plurality of stripe-type first internal electrode patterns 221a are printed in parallel and the second ceramic green sheet on which the plurality of stripe-type second internal electrode patterns 222a are printed in parallel may be alternately stacked.

In more detail, the first and second ceramic green sheets may be stacked so that a central portion of the stripe-type first internal electrode pattern 221a printed on the first ceramic green sheet and the interval d3 between the stripe-type second internal electrode patterns 222a printed on the second ceramic green sheet overlap each other.

Then, as illustrated in FIG. 6D, the ceramic green sheet laminate 210 may be cut so as to traverse the plurality of stripe-type first and second internal electrode patterns 221a and 222a. That is, the ceramic green sheet laminate 210 maybe cut in a bar-type laminate 220 along a cutting line C1-C1.

In more detail, the stripe-type first internal electrode pattern 221a and the stripe-type second internal electrode pattern 222a may be cut in a length direction to be divided into a plurality of internal electrodes having a predetermined width. In this case, the stacked ceramic green sheet may be also cut together with the internal electrode pattern. As a result, the dielectric layer may be formed to have the same width as that of the internal electrode.

The first and second internal electrodes may be exposed along cutting surfaces of the bar-type laminate 220. The cutting surfaces of the bar-type laminate may be referred to as first and second side surfaces of the bar-type laminate, respectively.

After sintering the ceramic green sheet laminate, the sintered ceramic green sheet laminate may be cut into the bar-type laminate. In addition, after cutting the ceramic green sheets into the bar-type laminate, the sintering may be performed. Although not limited thereto, the sintering may be performed at 1100 to 1300° C. under a $N_2$—$H_2$ atmosphere.

Figure 6E:
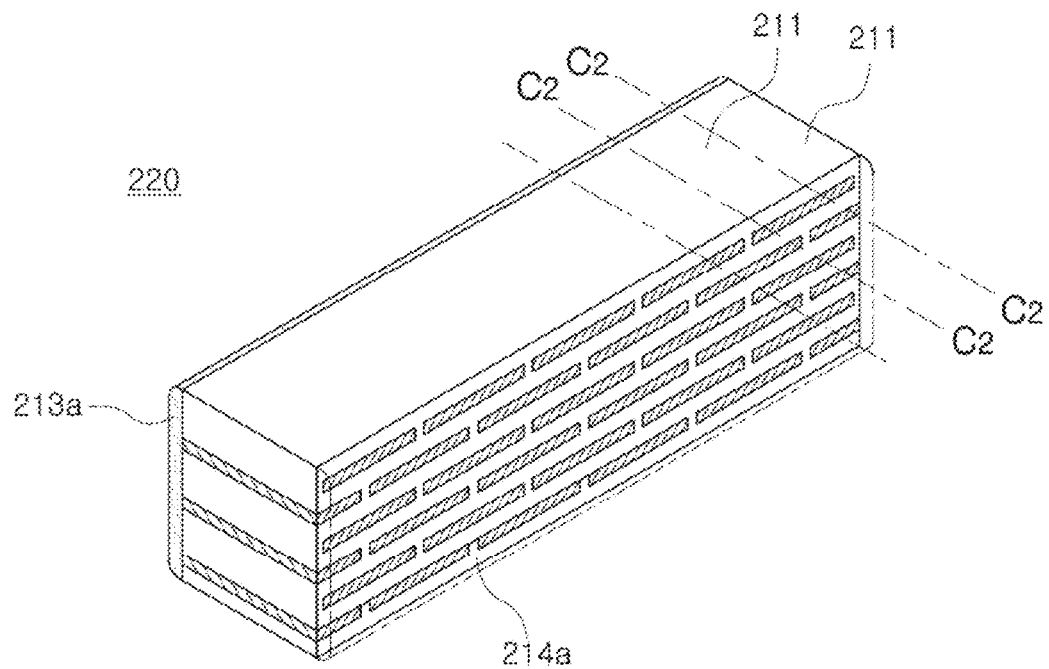

Next, as illustrated in FIG. 6E, first and second side margin portions 213a and 214a may be formed on the first and second side surfaces of the bar-type laminate 220, respectively. The second side margin portion 214a is not clearly illustrated, but a contour thereof is illustrated as a dotted line.

The first and second side margin portions 213a and 214a may be formed of ceramic slurry containing a ceramic powder on the bar-type laminate 220.

The ceramic slurry may contain the ceramic powder, an organic binder, and an organic solvent, and an amount of the ceramic slurry may be adjusted so that the first and second side margin portions 213a and 214a have the desired thickness.

The first and second side margin portions 213a and 214a may be formed by applying the ceramic slurry to the first and second side surfaces of the bar-type laminate 220. A method of applying the ceramic slurry is not particularly limited. For example, the ceramic slurry may be sprayed by a spray method or may be applied using a roller.

In addition, the first and second side margin portions 213a and 214a may be formed on the first and second side surfaces of the bar-type laminate by dipping the bar-type laminate into the ceramic slurry.

As described above, the first and second side margin portions may be formed to have a thickness of 18 µm or less.

Figure 6F:
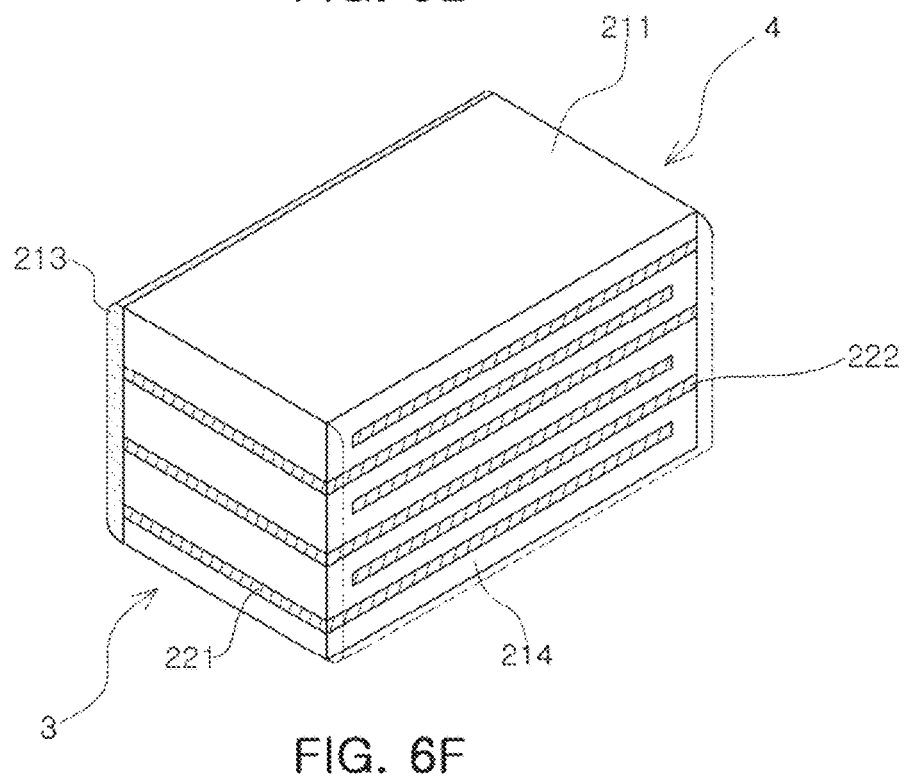

Next, as illustrated in FIGS. 6E and 6F, the bar-type laminate 220 on which the first and second side margin portions 213a and 214a are formed may be cut along a cutting line C2-C2 so as to meet an individual chip size. FIG. 6C may be referenced to determine a position of the cutting line C2-C2.

The ceramic body having a laminate 111 and the first and second side margin portions 113 and 114 formed on both side surfaces of the laminate may be formed by cutting the bar-type laminate 220 at a chip size.

As the bar-type laminate 220 is cut along the cutting line C2-C2, the central portion of the first internal electrode and the predetermined interval d3 formed between the second internal electrodes that overlap each other may be cut along the same cutting line as each other. In other aspect, the central portion of the second internal electrode and the predetermined interval between the first internal electrodes may be cut along the same cutting line.

Therefore, ends of the first and second internal electrodes may be alternately exposed to cutting surfaces along the cutting line C2-C2. The surface of the ceramic body to which the first internal electrode is exposed may be considered to be the third surface 3 of the laminate illustrated in FIG. 5, and the surface of the ceramic body to which the second internal electrode is exposed may be considered to be the fourth surface 4 of the laminate illustrated in FIG. 5.

The predetermined interval d3 between the stripe-type first internal electrode patterns 221a may be cut in half by cutting the bar-type laminate 220 along the cutting line C2-C2, such that a predetermined interval d2 may be formed between one end of the first internal electrode 121 and the fourth surface of the ceramic body. In addition, a predetermined interval may be formed between the second internal electrode 122 and the third surface of the ceramic body.

Next, external electrodes may be formed on the third and fourth surfaces of the ceramic body to be connected to one ends of the first and second internal electrodes, respectively.

In a case of forming first and second side margin portions in a bar-type laminate 220 and cutting the bar-type laminate at a chip size as in the present exemplary embodiment, the side margin portions may be formed on the plurality of laminates 111 by one-time process.

Further, although not illustrated, before forming the first and second side margin portions, the bar-type laminate may be cut at the chip size to form the plurality of laminates.

That is, the bar-type laminate may be cut so that the central portion of the first internal electrode and the predetermined interval between the second internal electrodes that overlap with each other may be cut along the same cutting line. Therefore, one ends of the first and second internal electrodes may be alternately exposed to the cutting surface.

Then, the first and second side margin portions may be formed on the first and second surfaces of the multilayer body. A method of forming the first and second side margin portions is as described above.

Further, external electrodes may be formed on the third surface of the multilayer body to which the first internal electrode is exposed and the fourth surface of the multilayer body to which the second internal electrode is exposed, respectively.

According to another exemplary embodiment in the present disclosure, side surfaces of the first and second internal electrodes may be exposed to the first and second surfaces of the laminate. The plurality of stacked first and second internal electrodes maybe simultaneously cut, such that the side surfaces thereof may be disposed on a straight line. Thereafter, the first and second side margin portions may be formed at once on the first and second surfaces of the laminate. The ceramic body may be formed by the laminate and the first and second side margin portions. That is, the first and second side margin portions may form the first and second side surfaces of the ceramic body.

Therefore, according to the present exemplary embodiment, a distance from the side surfaces of the plurality of internal electrodes to the first and second surfaces of the ceramic body may be formed to be constant. Further, the first and second side margin portions, which are formed of a ceramic paste, may be formed to have a thin thickness.

Hereinafter, the present disclosure will be described in detail through Experimental Examples, but the Experimental Examples are to help the specific understanding of the present disclosure. Therefore, the scope of the present disclosure is not limited thereto.

Experimental Example

A $BaTiO_3$ powder having a particle size of about 50 nm or less was used as a base material main ingredient, and accessory ingredient compositions were illustrated in the following Table 1.

At the time of preparing slurry, zirconia balls were used as mixing/dispersing media, and the base material main ingredient powder and accessory ingredient powders were mixed with ethanol/toluene and a dispersant and then mechanically milled. Then, in order to implement strength of a dielectric sheet, the binder mixing was added.

A forming sheet was manufactured at a thickness of 10 to 20 µm using the prepared slurry and a head-discharge type on-roll coater so as to form a side margin portion.

In addition, the forming sheet was cut at a size of 5 cm×5 cm so that the side margin portion may be formed by attaching the forming sheet to an electrode exposed portion of a green chip to which internal electrodes are exposed in a width direction without a margin.

The forming sheets were attached to both surfaces of the chip by applying a predetermined temperature and pressure under the conditions at which deformation of the chip may be minimized, thereby manufacturing a multilayer ceramic capacitor green chip having a 0603 size (length×width×height:0.6 mm×0.3 mm×0.3 mm).

After the multilayer ceramic capacitor sample manufactured as described above was subjected to calcination at 400° C. or less under a nitrogen atmosphere and then sintered under the conditions of a sintering temperature of 1200° C. or less and a hydrogen ($H_2$) concentration of 0.5% or less. Thereafter, electrical characteristics, insulation resistance, and chip strength of the multilayer ceramic capacitor sample, interfacial adhesion between the side margin portion and the internal electrode, whether or not voids were filled, a degree of formation of an insulating layer on a distal end of the electrode, a difference in density of the side margin portion, and the like, were comprehensively confirmed.

Room-temperature capacitances and dissipation factors of the multilayer ceramic capacitor (MLCC) manufactured using each of the compositions were measured at 1 kHz and AC voltage of 0.5V using a LCR-meter. In addition, 50 samples were each taken and breakdown voltages (BDVs) thereof at which dielectric breakdown occurred were measured.

Hardness of the side margin portion of the multilayer ceramic capacitor (MLCC) was measured using a Vickers hardness tester under the conditions at which a load was 5 kgf and a retention time was 5 seconds, and fine structures such as a density of the margin portion, a degree of formation of the insulating layer, and the like, was compared with respect to a fracture surface and a polished surface of the chip.

The following [Table 1] illustrates dielectric compositions in Experimental Examples (Comparative Examples and Inventive Examples). Here, $BaTiO_3$ was used as the base material main ingredient, and as the accessory ingredients, basic donor and acceptor type addition elements configuring the multilayer ceramic capacitor (MLCC) and elements serving as sintering aids, including Ba—Si—Al—Na—Li were used.

Here, in order to compare densities of the side margin portion, formation of an oxide layer on side surfaces of the electrode, filling of the voids, and interfacial adhesion according to Inventive Examples and Comparative Example of the present disclosure, a content ratio of the addition element to each of the accessory ingredients was variously changed.

The following [Table 2] summarizes and illustrates results of electrical characteristics and fine structures of actual multilayer ceramic capacitors (0603 size) corresponding to the compositions illustrated in [Table 1].

TABLE 1

| | Content (mole) of Each Additive per 100 Moles of Base Material Accessory Ingredient | | | | | | | | | Mn/ | Si/ | Si/ |
|---|---|---|---|---|---|---|---|---|---|---|---|---|
| Sample | MgO | $MnO_2$ | $NaCO_3$ | $Li_2O$ | $SiO_2$ | $Al_2O_3$ | $BaCO_3$ | $Dy_2O_3$ | $V_2O_5$ | (Mn + Mg + Al) | (Na + Si) | (Li + Si) |
| 1 | 0.00 | 1.20 | 0.00 | 0.00 | 3.3 | 0.5 | 1.2 | 0.8 | 0.1 | 0.706 | 1.000 | 1.000 |
| 2 | 0.25 | 1.20 | 0.50 | 0.50 | 3.3 | 0.5 | 1.2 | 0.8 | 0.1 | 0.615 | 0.868 | 0.868 |
| 3 | 0.50 | 1.20 | 1.00 | 1.00 | 3.3 | 0.5 | 1.2 | 0.8 | 0.1 | 0.545 | 0.767 | 0.767 |
| 4 | 0.75 | 1.20 | 1.50 | 1.50 | 3.3 | 0.5 | 1.2 | 0.8 | 0.1 | 0.490 | 0.688 | 0.688 |
| 5 | 1.00 | 1.20 | 2.00 | 2.00 | 3.3 | 0.5 | 1.2 | 0.8 | 0.1 | 0.444 | 0.623 | 0.623 |
| 6 | 1.25 | 1.20 | 0.00 | 0.00 | 3.3 | 0.5 | 1.2 | 0.8 | 0.1 | 0.407 | 1.000 | 1.000 |
| 7 | 1.50 | 1.20 | 0.50 | 0.50 | 3.3 | 0.5 | 1.2 | 0.8 | 0.1 | 0.375 | 0.868 | 0.868 |
| 8 | 1.70 | 1.20 | 1.00 | 1.00 | 3.3 | 0.5 | 1.2 | 0.8 | 0.1 | 0.353 | 0.767 | 0.767 |
| 9 | 1.90 | 1.20 | 1.50 | 1.50 | 3.3 | 0.5 | 1.2 | 0.8 | 0.1 | 0.333 | 0.688 | 0.688 |
| 10 | 2.10 | 1.20 | 2.00 | 2.00 | 3.3 | 0.5 | 1.2 | 0.8 | 0.1 | 0.316 | 0.623 | 0.623 |
| 11 | 2.30 | 1.20 | 0.00 | 0.00 | 3.3 | 0.5 | 1.2 | 0.8 | 0.1 | 0.300 | 1.000 | 1.000 |
| 12 | 2.50 | 1.20 | 0.50 | 0.50 | 3.3 | 0.5 | 1.2 | 0.8 | 0.1 | 0.286 | 0.868 | 0.868 |
| 13 | 2.70 | 1.20 | 1.00 | 1.00 | 3.3 | 0.5 | 1.2 | 0.8 | 0.1 | 0.273 | 0.767 | 0.767 |
| 14 | 2.90 | 1.20 | 1.50 | 1.50 | 3.3 | 0.5 | 1.2 | 0.8 | 0.1 | 0.261 | 0.688 | 0.688 |
| 15 | 3.10 | 1.20 | 2.00 | 2.00 | 3.3 | 0.5 | 1.2 | 0.8 | 0.1 | 0.250 | 0.623 | 0.623 |
| 16 | 1.5 | 0.00 | 0.00 | 0.00 | 3.3 | 0.5 | 1.2 | 0.8 | 0.1 | 0.000 | 1.000 | 1.000 |
| 17 | 1.5 | 0.20 | 0.50 | 0.50 | 3.3 | 0.5 | 1.2 | 0.8 | 0.1 | 0.091 | 0.868 | 0.868 |
| 18 | 1.5 | 0.40 | 1.00 | 1.00 | 3.3 | 0.5 | 1.2 | 0.8 | 0.1 | 0.167 | 0.767 | 0.767 |
| 19 | 1.5 | 0.60 | 1.50 | 1.50 | 3.3 | 0.5 | 1.2 | 0.8 | 0.1 | 0.231 | 0.688 | 0.688 |
| 20 | 1.5 | 0.80 | 2.00 | 2.00 | 3.3 | 0.5 | 1.2 | 0.8 | 0.1 | 0.286 | 0.623 | 0.623 |
| 21 | 1.5 | 1.00 | 0.00 | 0.00 | 3.3 | 0.5 | 1.2 | 0.8 | 0.1 | 0.333 | 1.000 | 1.000 |
| 22 | 1.5 | 1.40 | 1.00 | 1.00 | 3.3 | 0.5 | 1.2 | 0.8 | 0.1 | 0.412 | 0.767 | 0.767 |
| 23 | 1.5 | 1.60 | 1.50 | 1.50 | 3.3 | 0.5 | 1.2 | 0.8 | 0.1 | 0.444 | 0.688 | 0.688 |
| 24 | 1.5 | 1.80 | 2.00 | 2.00 | 3.3 | 0.5 | 1.2 | 0.8 | 0.1 | 0.474 | 0.623 | 0.623 |
| 25 | 1.5 | 2.00 | 0.00 | 0.00 | 3.3 | 0.5 | 1.2 | 0.8 | 0.1 | 0.500 | 1.000 | 1.000 |
| 26 | 1.5 | 2.20 | 0.50 | 0.50 | 3.3 | 0.5 | 1.2 | 0.8 | 0.1 | 0.524 | 0.868 | 0.868 |
| 27 | 1.5 | 2.40 | 1.00 | 1.00 | 3.3 | 0.5 | 1.2 | 0.8 | 0.1 | 0.545 | 0.767 | 0.767 |
| 28 | 1.5 | 2.60 | 1.50 | 1.50 | 3.3 | 0.5 | 1.2 | 0.8 | 0.1 | 0.565 | 0.688 | 0.688 |
| 29 | 1.5 | 2.80 | 2.00 | 2.00 | 3.3 | 0.5 | 1.2 | 0.8 | 0.1 | 0.583 | 0.623 | 0.623 |
| 30 | 1.5 | 3.00 | 0.00 | 0.00 | 3.3 | 0.5 | 1.2 | 0.8 | 0.1 | 0.600 | 1.000 | 1.000 |

TABLE 2

| | Structural Characteristics | | | | | | | Electrical Characteristics | | |
|---|---|---|---|---|---|---|---|---|---|---|
| Sample | Depth of Oxide Layer of Electrode | Filling Rate of Void | Porosity of Margin Portion | Interfacial Adhesion | Strength of Margin | Evaluation of Secondary Phase Control | Aggregation of Distal End Portion of Electrode | Dielectric Constant | High-Temperature Withstand Voltage | Short-circuit Ratio |
| 1 | X | X | X | X | X | ◎ | ◎ | Δ | Δ | ◎ |
| 2 | X | X | O | X | O | ◎ | ◎ | O | Δ | ◎ |
| 3 | X | Δ | O | X | O | ◎ | ◎ | ◎ | O | ◎ |
| 4 | Δ | O | O | Δ | O | O | O | ◎ | ◎ | O |
| 5 | O | ◎ | Δ | O | Δ | O | O | O | ◎ | O |
| 6 | O | ◎ | X | O | X | O | O | O | ◎ | O |
| 7 | ◎ | ◎ | ◎ | ◎ | ◎ | ◎ | ◎ | ◎ | ◎ | ◎ |

TABLE 2-continued

| | Structural Characteristics | | | | | | | Electrical Characteristics | | |
|---|---|---|---|---|---|---|---|---|---|---|
| Sample | Depth of Oxide Layer of Electrode | Filling Rate of Void | Porosity of Margin Portion | Interfacial Adhesion | Strength of Margin | Evaluation of Secondary Phase Control | Aggregation of Distal End Portion of Electrode | Dielectric Constant | High-Temperature Withstand Voltage | Short-circuit Ratio |
| 8  | ⊚ | ⊚ | ⊚ | ⊚ | ⊚ | ○ | ○ | ○ | ⊚ | ○ |
| 9  | ⊚ | ⊚ | ○ | ⊚ | ○ | ○ | ○ | ○ | ⊚ | ○ |
| 10 | ⊚ | ○ | △ | ⊚ | △ | △ | △ | △ | ○ | △ |
| 11 | ⊚ | ○ | X | ⊚ | X | ○ | ○ | △ | ○ | ○ |
| 12 | ⊚ | ○ | △ | ⊚ | △ | ○ | ○ | △ | △ | ○ |
| 13 | ⊚ | △ | △ | ⊚ | △ | △ | △ | △ | △ | △ |
| 14 | ⊚ | X | △ | ⊚ | △ | X | X | X | X | X |
| 15 | ⊚ | X | △ | ⊚ | △ | X | X | X | X | X |
| 16 | ⊚ | X | X | ⊚ | X | ⊚ | ⊚ | X | X | ⊚ |
| 17 | ⊚ | X | X | ⊚ | X | ⊚ | ⊚ | △ | X | ⊚ |
| 18 | ⊚ | △ | △ | ⊚ | △ | ⊚ | ⊚ | ○ | ○ | ⊚ |
| 19 | ⊚ | ○ | ○ | ⊚ | ○ | ⊚ | ⊚ | ○ | ○ | ⊚ |
| 20 | ⊚ | ⊚ | ○ | ⊚ | ○ | ⊚ | ⊚ | △ | ⊚ | ⊚ |
| 21 | ⊚ | ⊚ | X | ⊚ | X | ⊚ | ⊚ | ⊚ | ○ | ⊚ |
| 22 | ⊚ | ⊚ | ⊚ | ⊚ | ⊚ | ⊚ | ⊚ | ⊚ | ○ | ⊚ |
| 23 | ⊚ | ⊚ | ○ | ⊚ | ○ | ○ | ○ | ⊚ | ⊚ | ○ |
| 24 | ⊚ | ⊚ | △ | ⊚ | △ | ○ | ○ | △ | ○ | ○ |
| 25 | ○ | ⊚ | X | ○ | X | ○ | ○ | ○ | X | ○ |
| 26 | ○ | ⊚ | ○ | ○ | ○ | △ | △ | ○ | ○ | △ |
| 27 | △ | ⊚ | ○ | △ | ○ | △ | △ | △ | △ | △ |
| 28 | X | ⊚ | ○ | X | ○ | X | X | △ | △ | X |
| 29 | X | ⊚ | △ | X | △ | X | X | X | X | X |
| 30 | X | ⊚ | X | X | X | X | X | △ | X | X |

⊚: Excellent,
○: Good,
△: Fair,
X: Poor

As illustrated in Tables 1 and 2, a content ratio of Mg was 0.75 mol or more, which was effective in forming of an insulating layer in a portion of the electrode adjacent to the exposed surfaces of the electrode and improving interfacial adhesion, and addition of an excessive amount of Mg decreased a density of the side margin portion and was accompanied with a side effect of increasing a formation frequency of a secondary phase. Therefore, it maybe appreciated that a suitable content ratio of Mg satisfies 0.75≤Mg≤2.10.

Tables 1 and 2 also demonstrate that when a content ratio of [Mn/(Mn+Mg+Al)] satisfies 0.316≤Mn/(Mn+Mg+Al)≤ 0.500, electrical characteristics were satisfied. It may further be appreciated that, when contents of magnesium (Mg) and manganese (Mn) satisfy 0.75 mol≤Mg≤2.1 mol and 0.6 mol≤Mn≤2.0 mol, based on 100 mol of the base material powder, respectively the absolute content of Mn was suitably determined in a range satisfying 0.6≤Mn≤2.0, electrical characteristics were satisfied.

Figure 7A:
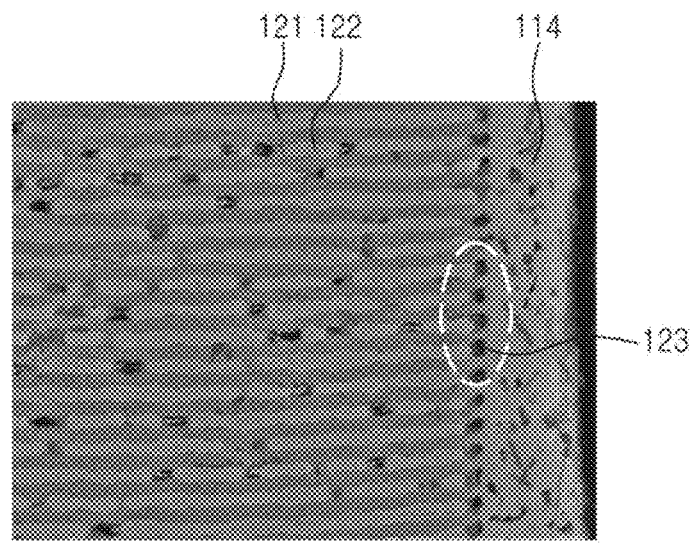
FIGS. 7A and 7B are scanning electron microscope (SEM) photographs of a cross section of a multilayer ceramic capacitor using a dielectric composition according to a Comparative Example of the present disclosure in which an accessory ingredient Mg was insufficiently contained.
Figure 7B:
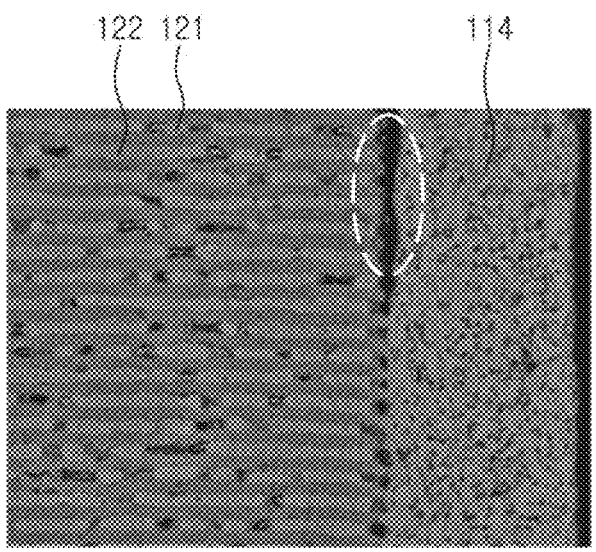

FIGS. 7A and 7B are scanning electron microscope (SEM) photographs of a cross section of a multilayer ceramic capacitor using a dielectric composition according to Comparative Example of the present disclosure in which an accessory ingredient Mg was insufficiently contained.

Figure 8A:
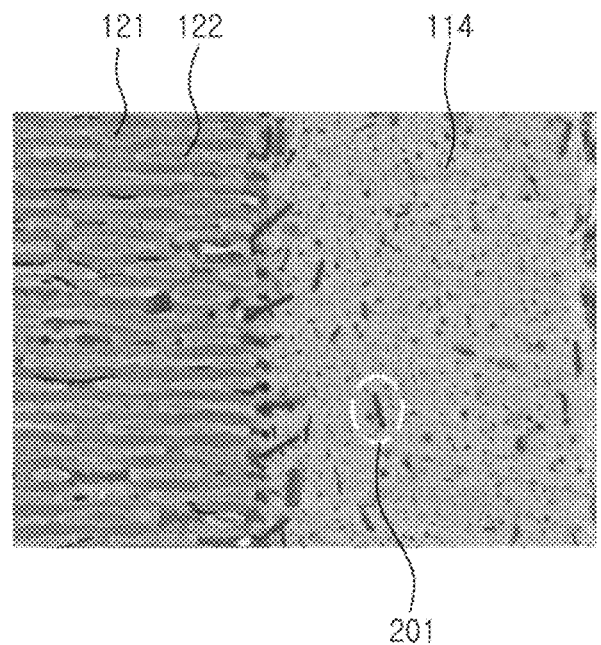
FIGS. 8A and 8B are scanning electron microscope (SEM) photographs of a cross section of a multilayer ceramic capacitor using a dielectric composition according to a Comparative Example of the present disclosure in which the accessory ingredient Mg was excessively contained.
Figure 8B:
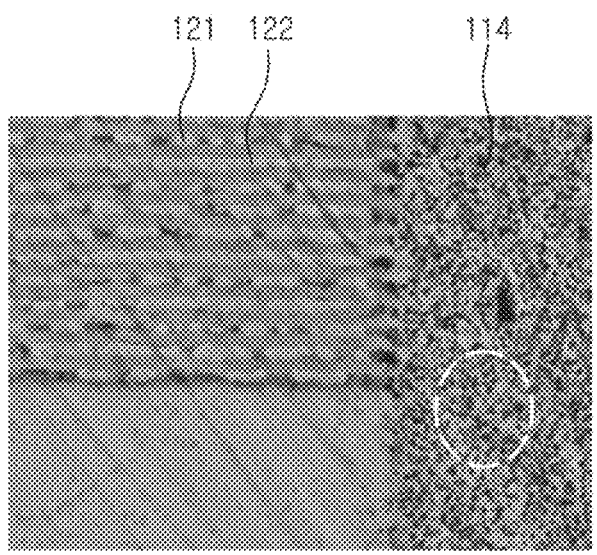

FIGS. 8A and 8B are scanning electron microscope (SEM) photographs of a cross section of a multilayer ceramic capacitor using a dielectric composition according to Comparative Example of the present disclosure in which the accessory ingredient Mg was excessively contained.

Referring to FIGS. 7A and 7B, in the multilayer ceramic capacitor using the dielectric composition in which the accessory ingredient Mg was insufficiently contained, an oxide layer 123 and an insulating layer were not effectively formed in portions of internal electrodes 121 and 122 adjacent to exposed surfaces of internal electrodes 121 and 122, and interfacial adhesion between the internal electrodes 121 and 122 and a margin portion 114 may be decreased. In FIG. 7B, a phenomenon in which interfacial adhesion was decreased was indicated by an oval.

Referring to FIGS. 8A and 8B, in the multilayer ceramic capacitor using the dielectric composition in which the accessory ingredient Mg was excessively contained, there were problems in that a formation frequency of a secondary phase 201 was increased, and a density of a side margin portion 114 was decreased. In FIG. 8B, a phenomenon in which the density of the side margin portion 114 was decreased was indicated by a circle.

Figure 9A:
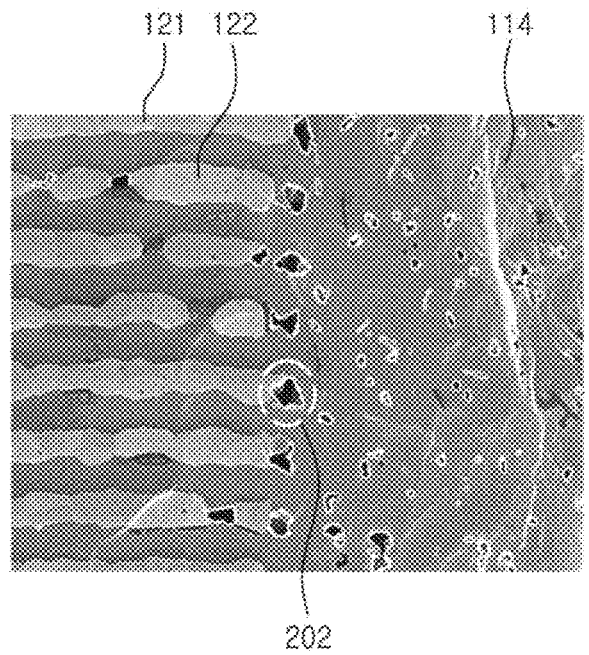
FIGS. 9A and 9B are scanning electron microscope (SEM) photographs of cross sections of multilayer ceramic capacitors using dielectric compositions according to Comparative Examples of the present disclosure in which an accessory ingredient Mn was insufficiently contained and excessively contained, respectively.
Figure 9B:
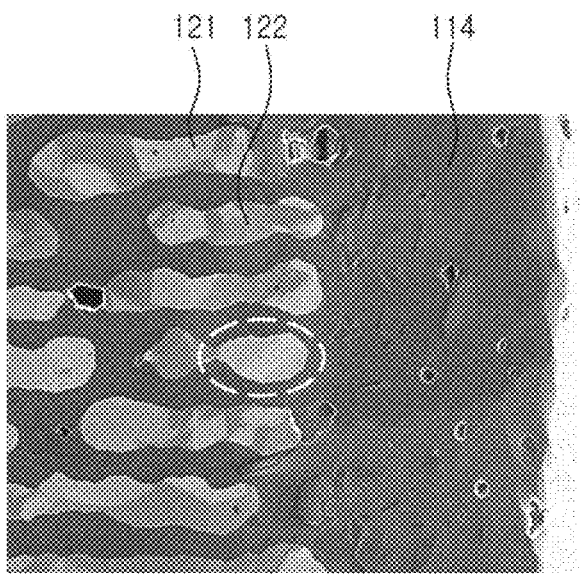

FIGS. 9A and 9B are scanning electron microscope (SEM) photographs of cross sections of multilayer ceramic capacitors using dielectric compositions according to Comparative Examples of the present disclosure in which an accessory ingredient Mn was insufficiently contained and excessively contained, respectively.

Referring to FIGS. 9A and 9B, in a case in which a content ratio of Mn was insufficient or excessive similarly to Mg, sintering characteristics or a void filling rate were affected. That is, when the content ratio of Mn was insufficient, based on a critical content ratio, voids were not effectively filled, such that there was a problem in that voids 202 were formed and thus reliability was deteriorated. On the contrary, when Mn was excessively added, the internal electrodes 121 and 122 and ceramics were excessively sintered, such that side effects such as aggregation of the electrodes may occur. In FIG. 9B, the aggregation phenomenon of the electrodes was indicated by an oval.

Figure 10:
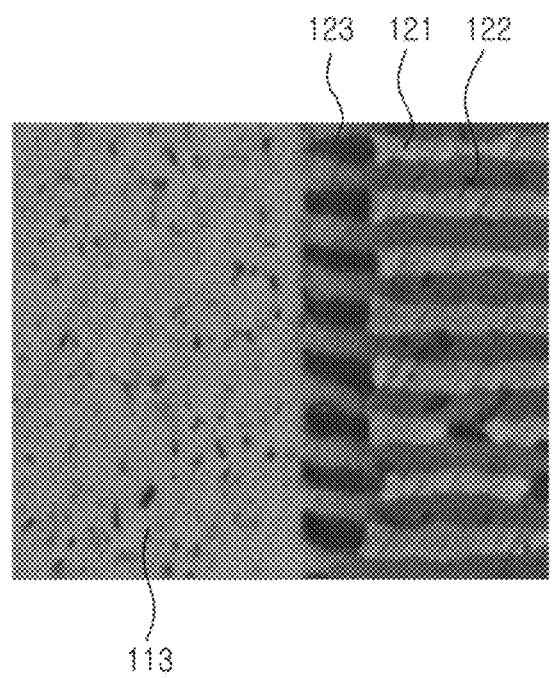
FIG. 10 is a scanning electron microscope (SEM) photograph of a cross-section of a multilayer ceramic capacitor manufactured using a dielectric composition according to an Inventive Example of the present disclosure.

FIG. 10 is a scanning electron microscope (SEM) photograph of a cross-section of a multilayer ceramic capacitor manufactured using a dielectric composition according to Inventive Example of the present disclosure.

Referring to FIG. 10, a decrease in interfacial adhesion between internal electrodes 121 and 122 and a margin portion 113 occurring in a manufacturing process of the multilayer ceramic capacitor in which the margin portion is separately attached to an electrode exposed surface of a capacitor in a width direction before the sintering after manufacturing the capacitor so that the internal electrodes are exposed to a body surface in the width direction may be prevented, and reliability may be improved by preventing voids from being formed between the internal electrodes 121 and 122 and the margin portions.

Further, a uniform oxide layer 123 and a uniform insulating layer may be secured at the distal end of the internal electrodes 121 and 122, such that a short-circuit defect may be decreased, and a density of the side margin portion 113 may be improved, such that mechanical strength and high-temperature/moisture resistance reliability of the multilayer ceramic capacitor may be improved.

Furthermore, in order to increase sintering driving force of the side margin portion to increase the density of the side margin portion and to effectively fill the voids in the distal end portions generated by contraction of the electrodes, addition composition ratios thereof to accessory ingredient elements such as Mg, Si, Al, and the like, in addition to adding Mn, Na, and Li, are important.

Therefore, according to the exemplary embodiment in the present disclosure, an absolute content ratio of Mn and a content ratio of [Mn/(Mn+Mg+Al)] were determined, based on experimental results obtained in an actual capacitor, based on a ternary phase diagram in a Mn—Mg—Al system, and it may be appreciated that the absolute content of Mn was suitably determined in a range satisfying $0.6 \leq Mn \leq 2.0$, and when the addition content ratio with other accessory ingredient elements was determined in a range satisfying $0.316 \leq Mn/(Mn+Mg+Al) \leq 0.500$, all of the electrical characteristics were satisfied.

As set forth above, according to exemplary embodiments in the present disclosure, the decrease in interfacial adhesion between the internal electrodes and the margin portion occurring in a manufacturing process of the multilayer ceramic capacitor in which the margin portion is separately attached to the electrode exposed surface of the capacitor in the width direction before the sintering after manufacturing the capacitor so that the internal electrodes are exposed to the body in the width direction may be prevented.

Further, reliability may be improved by preventing voids from being formed between the internal electrodes and the margin portions in the multilayer ceramic capacitor manufactured by the manufacturing process.

In addition, the uniform oxide layer and the uniform insulating layer may be secured on the distal ends of the internal electrodes, such that the short-circuit defect may be decreased.

Further, the density of the margin portion may be improved, such that mechanical strength and high-temperature/moisture resistance reliability of the multilayer ceramic capacitor may be improved.

Since the internal electrodes are entirely formed on the dielectric layers in the width direction, but the margin portions are separately attached after the internal electrodes are exposed to side surfaces of the body in the width direction, the area of the overlapping region between the internal electrodes may be significantly increased, such that a high capacitance multilayer ceramic capacitor may be implemented, and generation of a step by the internal electrodes may be decreased.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
a ceramic body having first and second surfaces opposing each other and third and fourth surfaces connecting the first and second surfaces to each other;
a plurality of internal electrodes disposed in the ceramic body, exposed to the first and second surfaces, and each having one end exposed to the third or fourth surface; and
first and second side margin portions disposed on the first and second surfaces and covering exposed surfaces of the internal electrodes,
wherein a dielectric composition contained in the first and second side margin portions is different from a dielectric composition contained in the ceramic body,
the first and second side margin portions contain a barium titanate-based base material powder and magnesium (Mg), manganese (Mn), and aluminum (Al) as accessory ingredients, and
a content ratio of manganese (Mn) to magnesium (Mg), manganese (Mn), and aluminum (Al) satisfies $0.316 \leq Mn/(Mn+Mg+Al) \leq 0.500$, based on a molar content of Mn, Mg and Al in the first and second side margin portions.

2. The multilayer ceramic capacitor of claim 1, wherein a content of magnesium (Mg) satisfies $0.75 \text{ mol} \leq Mg \leq 2.10$ mol, based on 100 mol of the base material powder.

3. The multilayer ceramic capacitor of claim 1, wherein a content of manganese (Mn) satisfies $0.6 \text{ mol} \leq Mn \leq 2.0$ mol, based on 100 mol of the base material powder.

4. The multilayer ceramic capacitor of claim 1, wherein the accessory ingredients include sodium (Na) and lithium (Li), and contents of sodium (Na) and lithium (Li) satisfy $0.5 \text{ mol} \leq Na \leq 1.5 \text{ mol}$ and $0.5 \text{ mol} \leq Li \leq 1.5 \text{ mol}$, based on 100 mol of the base material powder, respectively.

5. The multilayer ceramic capacitor of claim 4, wherein the accessory ingredients include silicon (Si), and content ratios of silicon to sodium (Na) and lithium (Li) satisfy $0.68 \leq Si/(Na+Si) \leq 0.87$, based on a molar content of Na and Si in the first and second side margin portions, and $0.68 \leq Si/(Li+Si) \leq 0.87$, based on a molar content of Li and Si in the first and second side margin portions, respectively.

6. The multilayer ceramic capacitor of claim 1, wherein the accessory ingredients include at least one of a first accessory ingredient, a second accessory ingredient and a third accessory ingredient, where the first accessory ingredient is an oxide or carbonate containing at least one of Y, Dy, Ho, Er, Gd, Ce, Nd, Sm, La, Tb, Yb, and Pr; the second accessory ingredient is an oxide or carbonate containing Ba; and the third accessory ingredient contains at least one of an oxide or carbonate containing at least one of Si and Al and a glass compound containing Si.

7. The multilayer ceramic capacitor of claim 6, wherein a content of the first accessory ingredient is 0.0 to 4.0 mol, based on 100 mol of the base material powder; a content of the second accessory ingredient is 0.0 to 5.0 mol, based on 100 mol of the base material powder; and a content of the third accessory ingredient is 0.0 to 5.0 mol, based on 100 mol of the base material powder.

8. The multilayer ceramic capacitor of claim 1, wherein the first and second side margin portions have an average thickness of 18 μm or less.

9. The multilayer ceramic capacitor of claim 1, wherein the internal electrodes are composed of a first internal electrode having one end exposed to the third surface and the other end disposed to be spaced apart from the fourth surface by a predetermined interval and a second internal electrode having one end exposed to the fourth surface and the other end disposed to be spaced apart from the third surface by the predetermined interval.

10. A multilayer ceramic capacitor comprising:
a ceramic body having first and second surfaces opposing each other and third and fourth surfaces connecting the first and second surfaces to each other;
a plurality of internal electrodes disposed in the ceramic body, exposed to the first and second surfaces, and each having one end exposed to the third or fourth surface; and
first and second side margin portions disposed on the first and second surfaces and covering exposed surfaces of the internal electrodes,
wherein in a cross section of the ceramic body in a width-thickness direction, an oxide region containing magnesium (Mg) is disposed in portions of the internal electrodes adjacent to the exposed surfaces,
the first and second side margin portions contain a barium titanate-based base material powder and magnesium (Mg), manganese (Mn), and aluminum (Al) as accessory ingredients, and
a content ratio of manganese (Mn) to magnesium (Mg), manganese (Mn), and aluminum (Al) satisfies $0.316 \leq Mn/(Mn+Mg+Al) \leq 0.500$, based on a molar content of Mn, Mg and Al in the first and second side margin portions.

11. The multilayer ceramic capacitor of claim 10, wherein a content of magnesium (Mg) satisfies $0.75 \text{ mol} \leq Mg \leq 2.10 \text{ mol}$, based on 100 mol of the base material powder.

12. The multilayer ceramic capacitor of claim 10, wherein a content of manganese (Mn) satisfies $0.6 \text{ mol} \leq Mn \leq 2.0 \text{ mol}$, based on 100 mol of the base material powder.

13. The multilayer ceramic capacitor of claim 10 wherein the accessory ingredients include sodium (Na) and lithium (Li), and contents of sodium (Na) and lithium (Li) satisfy $0.5 \text{ mol} \leq Na \leq 1.5 \text{ mol}$ and $0.5 \text{ mol} \leq Li \leq 1.5 \text{ mol}$, based on 100 mol of the base material powder, respectively.

14. The multilayer ceramic capacitor of claim 13, wherein the accessory ingredients include silicon (Si), and content ratios of silicon to sodium (Na) and lithium (Li) satisfy $0.68 \leq Si/(Na+Si) \leq 0.87$, based on a molar content of Na and Si in the first and second side margin portions, and $0.68 \leq Si/(Li+Si) \leq 0.87$, based on a molar content of Li and Si in the first and second side margin portions, respectively.

15. The multilayer ceramic capacitor of claim 10, wherein the accessory ingredients include at least one of a first accessory ingredient, a second accessory ingredient and a third accessory ingredient, where the first accessory ingredient is an oxide or carbonate containing at least one of Y, Dy, Ho, Er, Gd, Ce, Nd, Sm, La, Tb, Yb, and Pr; the second accessory ingredient is an oxide or carbonate containing Ba; and the third accessory ingredient contains at least one of an oxide or carbonate containing at least one of Si and Al and a glass compound containing Si.

16. The multilayer ceramic capacitor of claim 10, wherein a content of the first accessory ingredient is 0.0 to 4.0 mol, based on 100 mol of the base material powder; a content of the second accessory ingredient is 0.0 to 5.0 mol, based on 100 mol of the base material powder; and a content of the third accessory ingredient is 0.0 to 5.0 mol, based on 100 mol of the base material powder.

17. The multilayer ceramic capacitor of claim 10, wherein the first and second side margin portions have an average thickness of 18 μm or less.

18. The multilayer ceramic capacitor of claim 10, wherein the internal electrodes are composed of a first internal electrode having one end exposed to the third surface and the other end disposed to be spaced apart from the fourth surface by a predetermined interval and a second internal electrode having one end exposed to the fourth surface and the other end disposed to be spaced apart from the third surface by the predetermined interval.

19. The multilayer ceramic capacitor of claim 10, wherein a dielectric composition contained in the first and second side margin portions is different from a dielectric composition contained in the ceramic body.

20. A multilayer ceramic capacitor comprising:
a ceramic body having first and second surfaces opposing each other and third and fourth surfaces connecting the first and second surfaces to each other;
a plurality of internal electrodes disposed in the ceramic body, exposed to the first and second surfaces, and each having one end exposed to the third or fourth surface; and
first and second side margin portions disposed on the first and second surfaces and covering exposed surfaces of the internal electrodes,
wherein a dielectric composition contained in the first and second side margin portions is different from a dielectric composition contained in the ceramic body,
the first and second side margin portions contain a barium titanate-based base material powder and magnesium (Mg), manganese (Mn), and aluminum (Al) as accessory ingredients, and
contents of magnesium (Mg) and manganese (Mn) satisfy $0.75 \text{ mol} \leq Mg \leq 2.1 \text{ mol}$ and $0.6 \text{ mol} \leq Mn \leq 2.0 \text{ mol}$, based on 100 mol of the base material powder, respectively.

21. The multilayer ceramic capacitor of claim 20, wherein the accessory ingredients include sodium (Na) and lithium (Li), and contents of sodium (Na) and lithium (Li) satisfy $0.5 \text{ mol} \leq Na \leq 1.5 \text{ mol}$ and $0.5 \text{ mol} \leq Li \leq 1.5 \text{ mol}$, based on 100 mol of the base material powder, respectively.

22. The multilayer ceramic capacitor of claim 21, wherein the accessory ingredients include silicon (Si), and content ratios of silicon to sodium (Na) and lithium (Li) satisfy $0.68 \leq Si/(Na+Si) \leq 0.87$, based on a molar content of Na and Si in the first and second side margin portions, and $0.68 \leq Si/(Li+Si) \leq 0.87$, based on a molar content of Li and Si in the first and second side margin portions, respectively.

23. The multilayer ceramic capacitor of claim 20, wherein the accessory ingredients include at least one of a first accessory ingredient, a second accessory ingredient and a third accessory ingredient, where the first accessory ingredient is an oxide or carbonate containing at least one of Y, Dy, Ho, Er, Gd, Ce, Nd, Sm, La, Tb, Yb, and Pr; the second accessory ingredient is an oxide or carbonate containing Ba; and the third accessory ingredient contains at least one of an oxide or carbonate containing at least one of Si and Al and a glass compound containing Si.

24. The multilayer ceramic capacitor of claim 23, wherein a content of the first accessory ingredient is 0.0 to 4.0 mol, based on 100 mol of the base material powder; a content of the second accessory ingredient is 0.0 to 5.0 mol, based on 100 mol of the base material powder; and a content of the third accessory ingredient is 0.0 to 5.0 mol, based on 100 mol of the base material powder.

\* \* \* \* \*